(12) United States Patent
Matz et al.

(10) Patent No.: US 12,716,456 B2
(45) Date of Patent: Aug. 25, 2026

(54) SHAFT COUPLING

(71) Applicant: AGILENT TECHNOLOGIES, INC., Santa Clara, CA (US)

(72) Inventors: Patrick Matz, Santa Clara, CA (US); Manuel Van Venrooy, Santa Clara, CA (US); Alan Norman, Santa Clara, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 485 days.

(21) Appl. No.: 18/128,817

(22) Filed: Mar. 30, 2023

(65) Prior Publication Data

US 2023/0349426 A1 Nov. 2, 2023

Related U.S. Application Data

(60) Provisional application No. 63/326,521, filed on Apr. 1, 2022.

(51) Int. Cl.

*F16D 1/112* (2006.01)
*F16B 7/20* (2006.01)
*F16B 21/04* (2006.01)

(52) U.S. Cl.

CPC ................ *F16D 1/112* (2013.01); *F16B 7/20* (2013.01); *F16B 21/04* (2013.01); *Y10T 403/7007* (2015.01)

(58) Field of Classification Search

CPC ... B25G 3/16; F16B 7/20; F16B 21/02; F16B 21/04; F16D 1/108; F16D 1/112; Y10T 403/7005; Y10T 403/7007

(Continued)

(56) References Cited

U.S. PATENT DOCUMENTS 1,294,304 A 2/1919 Pittman
2,076,918 A 4/1937 Robison (Continued)

FOREIGN PATENT DOCUMENTS

CN 205629158 U 10/2016
CN 108775315 A 11/2018

(Continued)

OTHER PUBLICATIONS

International Search Report and Written Opinion for PCT Application No. PCT/US2023/017048, mailed Jul. 20, 2023, 8 pages.

(Continued)

*Primary Examiner* — Josh Skroupa

(57) ABSTRACT

A shaft coupling system may include a first shaft including a disc that is engageable by a second shaft to retain the second shaft with the first shaft when the second shaft is rotated in a first direction, and release the second shaft from the first shaft when the second shaft is rotated in a second direction that is opposite to the first direction. A spring may be mounted to the first shaft to bias the second shaft towards the first shaft when the second shaft is retained with the first shaft. Further, a shaft coupling method may include engaging a second shaft with a disc of a first shaft by rotating the second shaft in a first direction relative to the first shaft, and disengaging the second shaft from the first shaft by rotating the second shaft in a second direction relative to the first shaft.

19 Claims, 17 Drawing Sheets

(58) Field of Classification Search
USPC .................................. 403/348, 349; 464/125
See application file for complete search history.

(56) References Cited

U.S. PATENT DOCUMENTS 2,267,802 A 12/1941 Purdy
2,337,402 A 12/1943 Mills
3,345,711 A 10/1967 Mccarthy
3,362,050 A 1/1968 Mccarthy
3,798,701 A * 3/1974 Irwin ...................... E04G 21/10 403/349
4,459,785 A 7/1984 Zimmer
4,614,443 A * 9/1986 Hamert .................. G01K 1/146 403/349
4,711,596 A 12/1987 Bruderer
4,906,147 A * 3/1990 Friesinger ............. B23B 31/113 403/349
4,943,182 A * 7/1990 Hoblingre ............... F16D 1/108 403/349
5,407,293 A 4/1995 Crainich
5,464,300 A 11/1995 Crainich
5,589,649 A 12/1996 Brinker et al.
5,741,084 A 4/1998 Rio et al.
5,816,701 A * 10/1998 Martin ................... G01N 13/00 366/208
6,126,359 A * 10/2000 Dittrich ..................... F16B 7/20 403/349
6,336,739 B1 * 1/2002 Lee ......................... B01F 35/95 366/147
6,602,093 B1 * 8/2003 Cannon .................. H01R 24/44 439/578
6,829,455 B2 * 12/2004 Yasumoto ............... F16D 1/112 399/167
6,883,604 B2 * 4/2005 Mack ...................... F16D 1/108 464/182
7,980,781 B2 * 7/2011 Trice ........................ B25G 3/16 403/349
8,197,155 B2 6/2012 Noh
8,490,250 B2 * 7/2013 Lanz ........................ B25G 3/16 16/427
8,840,060 B2 9/2014 Soulier et al.
8,931,973 B2 1/2015 Olszewski
10,514,718 B2 12/2019 Wang et al.
12,350,000 B2 * 7/2025 Zergiebel ............... A61B 34/71
2009/0165578 A1 * 7/2009 Zamloot ................. B01F 33/81 73/864.91
2012/0227257 A1 * 9/2012 Kalavitz ................. F16B 21/04 403/300
2016/0346742 A1 12/2016 Hitchens et al.
2020/0122313 A1 4/2020 Takada

FOREIGN PATENT DOCUMENTS

CN 112324767 A 2/2021
DE 202012102689 U1 10/2012
DE 202015104405 U1 9/2015
DE 102014205889 A1 * 10/2015 .............. F16B 21/04
DE 102017128601 A1 * 6/2019 .............. F16D 1/112
EP 0791758 A1 * 8/1997 ................ F16B 7/20
EP 3070390 A1 * 9/2016 ................ F16B 7/20
JP S62177909 U 11/1987
KR 20090090071 A 8/2009
KR 20190010544 A 1/2019
WO WO-9710930 A1 * 3/1997 ............... B25G 3/16
WO 2016166456 A1 10/2016

OTHER PUBLICATIONS

Extended European Search Report—Application No. 23781855.4—mailed Feb. 19, 2026—9 pages.
KR Office Action—Application No. 10-2024-7034243—mailed Jan. 23, 2026—11 pages.

* cited by examiner

SHAFT COUPLING

PRIORITY

This application claims priority to commonly assigned and co-pending U.S. Provisional Application Ser. No. 63/326,521, filed Apr. 1, 2022, the disclosure of which is hereby incorporated by reference in its entirety.

BACKGROUND

In various industrial applications, two or more shafts may need to be coupled to each other so as to retain the shafts with each other. For example, in dissolution applications, two or more shafts may need to be coupled to each other for testing, and other purposes. In some cases, shafts of different lengths may need to be coupled to each other depending on an intended use. In other cases, a worn or otherwise damaged shaft may need to be replaced with another shaft by decoupling the shafts from each other so as to release the shafts from each other. Various techniques may be utilized to couple and decouple shafts.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
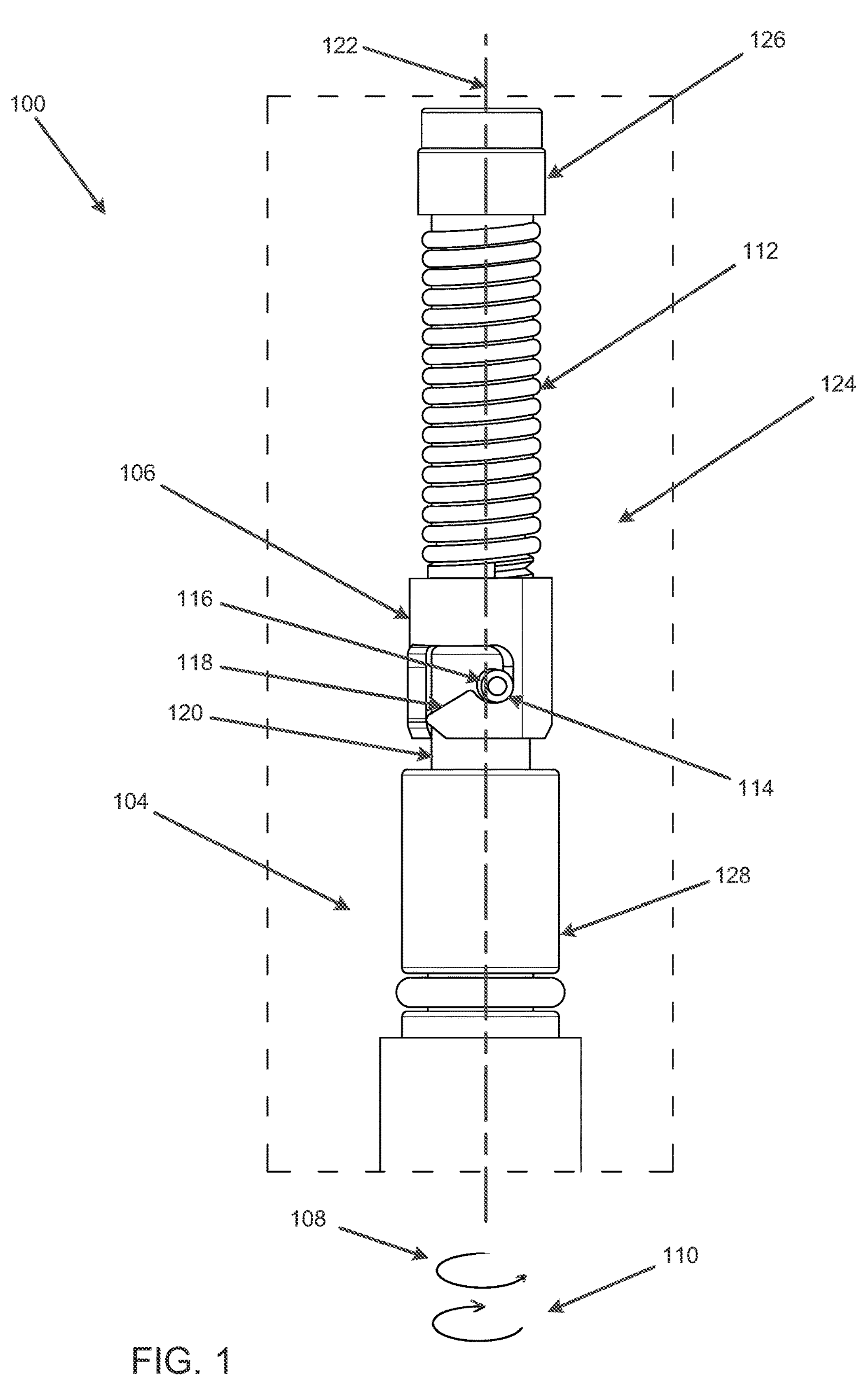
FIG. 1 illustrates a side view of a first embodiment of a shaft coupling system in a locked configuration, with an outer casing of a first shaft removed and a second shaft retained by a disc of the first shaft, in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms “a” and “an” are intended to denote at least one of a particular element. As used herein, the term “includes” means includes but not limited to, and the term “including” means including but not limited to. The term “based on” means based at least in part on.

With respect to coupling of shafts, such as shafts utilized in dissolution applications, various techniques may be utilized to couple and decouple shafts. For example, shafts may be coupled by screwing one shaft onto another, and decoupled by a reverse process. With respect to such coupling techniques, it is technically challenging to maintain repeatability of a relatively smooth coupling operation as dirt and corrosion may interfere with shaft coupling areas (e.g., screw threads). It is further technically challenging to maintain shafts in a coupled configuration (e.g., locked or otherwise retained with each other) as the coupling may become loose over time. Yet further, it is technically challenging to prevent damage to shaft coupling areas, for example, due to over-tightening. Moreover, it is technically challenging to relatively quickly and repeatedly couple and decouple shafts, for example, due to the time needed to precisely couple one shaft to another shaft.

In order to address at least the aforementioned technical challenges, a shaft coupling system is disclosed herein and may include a profiled disc that is permanently pushed or pulled in one direction (e.g., upwards) in a first shaft (e.g., upper shaft). By pushing a second shaft (e.g., lower shaft) through the disc and turning the second shaft by 90°, the first shaft may be coupled (e.g., locked) to the second shaft. The disc may be spring loaded in that the second shaft geometry may interact with the spring loaded disc in the first shaft, where the disc may not rotate, but may move (e.g., up or down) by force of the second shaft rotation. The force and/or torque needed for coupling the first and second shafts may be relatively lower compared to decoupling of the first shaft from the second shaft. These variations in coupling versus decoupling may be achieved by asymmetric shapes in the spring loaded disc as disclosed herein. The spring, which may constantly pull or push the second shaft towards the first shaft, may create a relatively strong connection between the first and second shafts to prevent loosening over time. This spring action may also function as a force limiter against pulling too strong, which may cause possible damage to an associated instrument. The coupling of the first and second shafts may also include an acoustic and haptic feedback to signal locking of the first shaft with the second shaft.

According to examples disclosed herein, a shaft coupling system may include a first shaft (e.g., upper shaft) including a disc that is engageable by a second shaft (e.g., lower shaft) to retain (e.g., couple or otherwise lock) the second shaft with the first shaft when the second shaft is rotated in a first direction, and release (e.g., decouple or otherwise unlock) the second shaft from the first shaft when the second shaft is rotated in a second direction that is opposite to the first direction. A spring may be mounted to the first shaft to bias the second shaft towards the first shaft when the second shaft is retained with the first shaft.

For the shaft coupling system described above, the disc may include a notch to retain a protrusion of the second shaft so as to retain the second shaft with the first shaft.

For the shaft coupling system described above, the disc may include an angled tooth to guide the protrusion into the notch when the second shaft is rotated in the first direction.

For the shaft coupling system described above, the disc may include the angled tooth to guide the protrusion away from the notch when the second shaft is rotated in the second direction.

For the shaft coupling system described above, the spring may bias the disc away from the second shaft when the second shaft is retained with the first shaft.

For the shaft coupling system described above, the spring may include an extension spring that extends when the second shaft is retained with the first shaft.

For the shaft coupling system described above, the spring may include a compression spring that compresses when the second shaft is retained with the first shaft.

For the shaft coupling system described above, the second shaft may include at least one protrusion that engages the disc to retain the second shaft with the first shaft. Further, the at least one protrusion may protrude orthogonally from a reduced diameter portion of the second shaft.

For the shaft coupling system described above, the second shaft may include at least one protrusion that engages the disc to retain the second shaft with the first shaft. The at least one protrusion may be formed on a T-shaped extension on a reduced diameter portion of the second shaft.

For the shaft coupling system described above, the disc may include an opening to receive at least one protrusion of the second shaft. The at least one protrusion may exit radially through the disc relative to a central axis of the disc and engage the disc to retain the second shaft with the first shaft.

For the shaft coupling system described above, the disc may include an opening to receive at least one protrusion of the second shaft. The at least one protrusion may exit axially through the disc relative to a central axis of the disc and engage the disc to retain the second shaft with the first shaft.

According to examples disclosed herein, a shaft coupling system may include a first shaft including a disc that is engageable by a second shaft to retain the second shaft with the first shaft based on a first movement of the second shaft relative to the first shaft, and release the second shaft from the first shaft based on a second movement of the second shaft relative to the first shaft. The second movement may be generally opposite of the first movement. A spring may be mounted to the first shaft to bias the second shaft towards the first shaft when the second shaft is retained with the first shaft.

According to examples disclosed herein, a shaft coupling method may include engaging a second shaft with a disc of a first shaft by rotating the second shaft in a first direction relative to the first shaft, and disengaging the second shaft from the first shaft by rotating the second shaft in a second direction relative to the first shaft. The second direction may be generally opposite to the first direction. Further, a spring mounted to the first shaft may bias the second shaft towards the first shaft when the second shaft is engaged with the first shaft.

For the shaft coupling method described above, engaging the second shaft with the disc of the first shaft may further include engaging the second shaft with the first shaft by retaining a protrusion of the second shaft with a notch in the disc.

The shaft coupling method described above may further include guiding the protrusion into the notch by an angled tooth of the disc when the second shaft is rotated in the first direction.

The shaft coupling method described above may further include guiding the protrusion away from the notch by an angled tooth of the disc when the second shaft is rotated in the second direction.

The shaft coupling method described above may further include biasing, by the spring, the disc away from the second shaft when the second shaft is engaged with the first shaft.

For the shaft coupling method described above, engaging the second shaft with the disc of the first shaft may further include engaging at least one protrusion of the second shaft with the disc to engage the second shaft with the first shaft. The at least one protrusion may protrude orthogonally from a reduced diameter portion of the second shaft.

For the shaft coupling method described above, engaging the second shaft with the disc of the first shaft may further include engaging at least one protrusion of the second shaft with the disc to engage the second shaft with the first shaft. The at least one protrusion may be formed on a T-shaped extension on a reduced diameter portion of the second shaft.

For the shaft coupling method described above, engaging the second shaft with the disc of the first shaft may further include receiving, by an opening in the disc, at least one protrusion of the second shaft, and engaging the second shaft with the first shaft by radially exiting the at least one protrusion through the disc relative to a central axis of the disc to engage the disc.

According to examples disclosed herein, a shaft coupling system may include a first shaft including a movable disc that is engageable by a second shaft to retain the second shaft with the first shaft based on a first movement of the second shaft relative to the first shaft, and release the second shaft from the first shaft based on a second movement of the second shaft relative to the first shaft. The second movement may be generally opposite of the first movement.

For the shaft coupling system described above, the first shaft may include a spring to bias the second shaft towards the first shaft when the second shaft is retained with the first shaft.

For the shaft coupling system described above, the coupling of the first shaft and the second shaft may be realized without any change in an outer diameter of the first and second shafts. In this regard, when the first and second shafts are coupled together, the shafts may include a continuous outer diameter without any gaps.

FIG. 1 illustrates a side view of a first embodiment of a shaft coupling system 100 in a locked configuration, with an outer casing 200 (e.g., see FIG. 2) of a first shaft 102 (e.g., see FIG. 2) removed and a second shaft 104 retained by a disc 106 of the first shaft 102, in accordance with an example of the present disclosure.

Referring to FIG. 1, the first embodiment of the shaft coupling system 100 is shown as including the first shaft 102 (e.g., see FIG. 2) including the disc 106 that is engageable by the second shaft 104 to retain (e.g., by locking) the second shaft 104 with the first shaft 102 when the second shaft 104 is rotated in a first direction 108. Further, the second shaft 104 may be released (e.g., by unlocking) from the first shaft 102 when the second shaft 104 is rotated in a second direction 110 that is opposite to the first direction 108. A spring 112 may be mounted to the first shaft 102 by a retention sleeve 126 to bias the second shaft 104 towards the first shaft 102 when the second shaft 104 is retained with the first shaft 102. The assembly including the disc 106 and the spring 112 may be denoted a retention assembly 124. The retention assembly 124 may be disposed in an outer casing 200 to form the first shaft 102 as disclosed herein with respect to FIG. 2.

With respect to the shaft coupling system 100, the disc 106 may be movable. Specifically, the first shaft 102 may include the movable disc 106 that is engageable by the second shaft 104 to retain the second shaft 104 with the first shaft 102 based on a first movement (e.g., bringing towards first shaft 102 and rotation) of the second shaft 104 relative to the first shaft 102, and release the second shaft 104 from the first shaft 102 based on a second movement (e.g., opposite rotation and moving away from first shaft 102) of the second shaft 104 relative to the first shaft 102. The second movement may be generally opposite of the first movement.

The disc 106 may include a notch 114 to retain a protrusion 116 of the second shaft 104 so as to retain the second shaft 104 with the first shaft 102. Further, the disc 106 may include an angled tooth 118 to guide the protrusion 116 into the notch 114 when the second shaft 104 is rotated in the first direction 108. Similarly, the angled tooth 118 may guide the protrusion 116 away from the notch 114 when the second shaft 104 is rotated in the second direction 110.

For the example of FIG. 1, the spring 112 may bias the disc 106 away from the second shaft 104 when the second shaft 104 is retained with the first shaft 102. The spring 112 may include an extension spring that extends when the second shaft 104 is retained with the first shaft 102.

The second shaft 104 may include the protrusion 116 (or additional protrusions) that engages the disc 106 to retain the second shaft 104 with the first shaft 102. Further, the protrusion 116 may protrude orthogonally from a reduced diameter portion 120 of the second shaft 104.

The disc 106 may include an opening 900 (see FIG. 9B) to receive the protrusion 116 of the second shaft 104. The protrusion 116 may exit radially through the disc 106 relative to a central axis 122 of the disc 106 and engage the disc 106 to retain the second shaft 104 with the first shaft 102.

Figure 2:
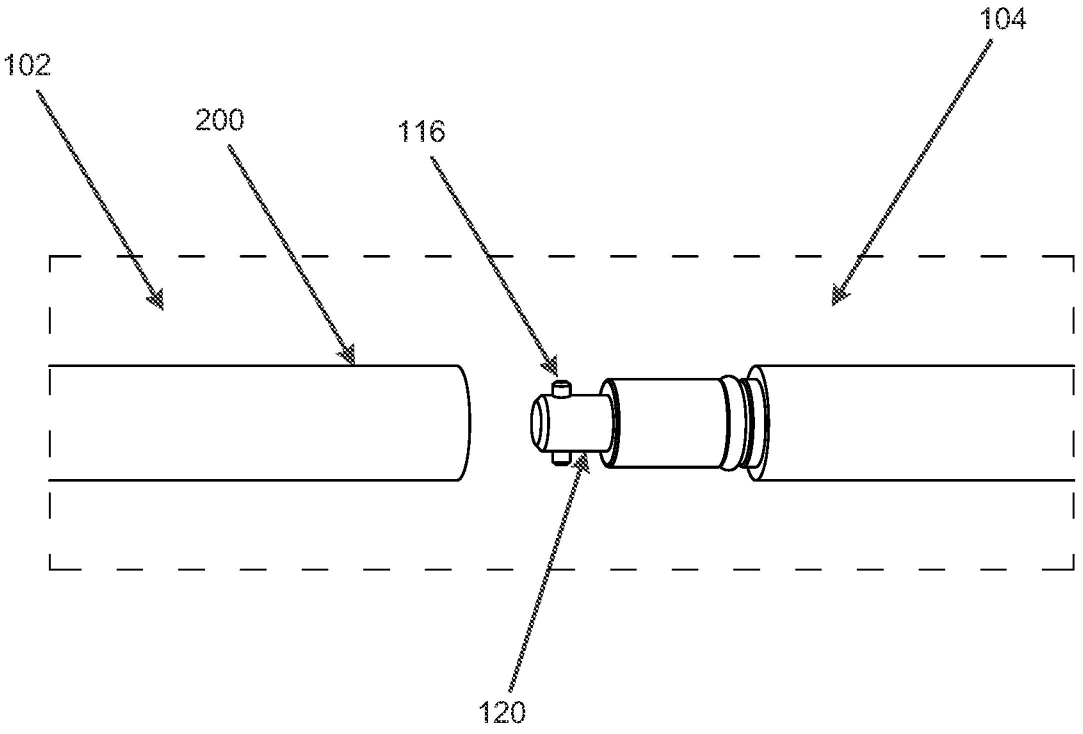
FIG. 2 illustrates partial isometric views of first and second shafts of the first embodiment of the shaft coupling system of FIG. 1, in accordance with an example of the present disclosure.

FIG. 2 illustrates partial isometric views of the first shaft 102 and the second shaft 104 of the first embodiment of the shaft coupling system 100, in accordance with an example of the present disclosure.

Referring to FIGS. 1 and 2, the first shaft 102 and the second shaft 104 may be brought towards each other to retain (e.g., by locking) the second shaft 104 with the first shaft 102 when the second shaft 104 is rotated in the first direction 108 (e.g., as shown in FIG. 1). Similarly, the first shaft 102 and the second shaft 104 may be released (e.g., by unlocking) from each other by releasing the second shaft 104 from the first shaft 102 when the second shaft 104 is rotated in the second direction 110 (e.g., as shown in FIG. 1) that is opposite to the first direction 108. In the example of FIG. 2, outer casing 200 of the first shaft 102 is shown, with the retention assembly 124 disposed therein.

Figures 3, 4:
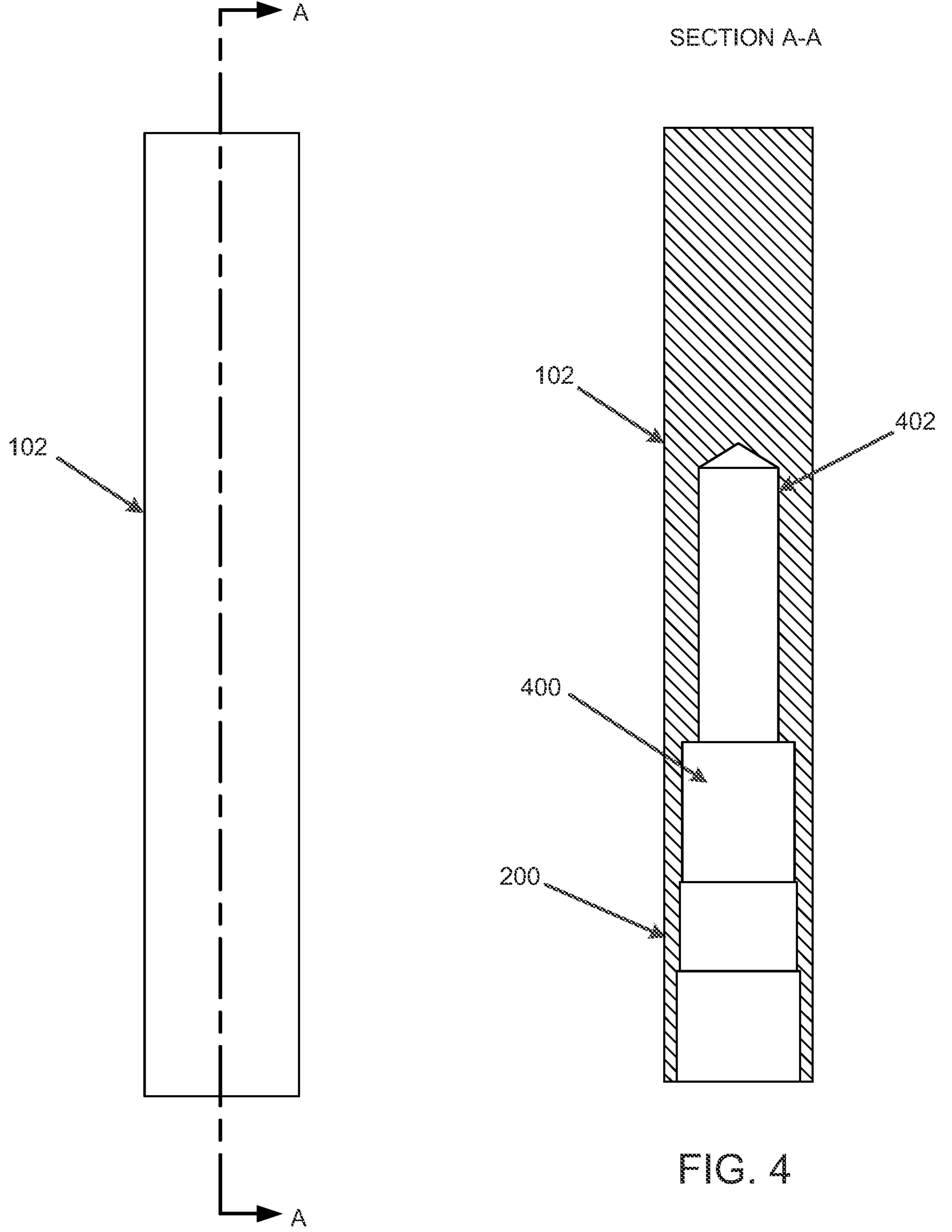
FIG. 3 illustrates a side view of the first shaft of the first embodiment of the shaft coupling system of FIG. 1, in accordance with an example of the present disclosure.
FIG. 4 illustrates a sectional view of the first shaft of the first embodiment of the shaft coupling system of FIG. 1, taken generally along section A-A of FIG. 3, in accordance with an example of the present disclosure.

FIG. 3 illustrates a side view of the first shaft 102 of the first embodiment of the shaft coupling system 100, in accordance with an example of the present disclosure. FIG. 4 illustrates a sectional view of the first shaft 102 of the first embodiment of the shaft coupling system 100, taken generally along section A-A of FIG. 3, in accordance with an example of the present disclosure.

Referring to FIGS. 1, 3, and 4, the first shaft 102 may include hollow area 400 for the retention assembly 124 that includes the disc 106, the spring 112, and the retention sleeve 126. The retention sleeve 126 may be fixedly disposed in reduced diameter portion 402 of the hollow area 400.

Figure 5:
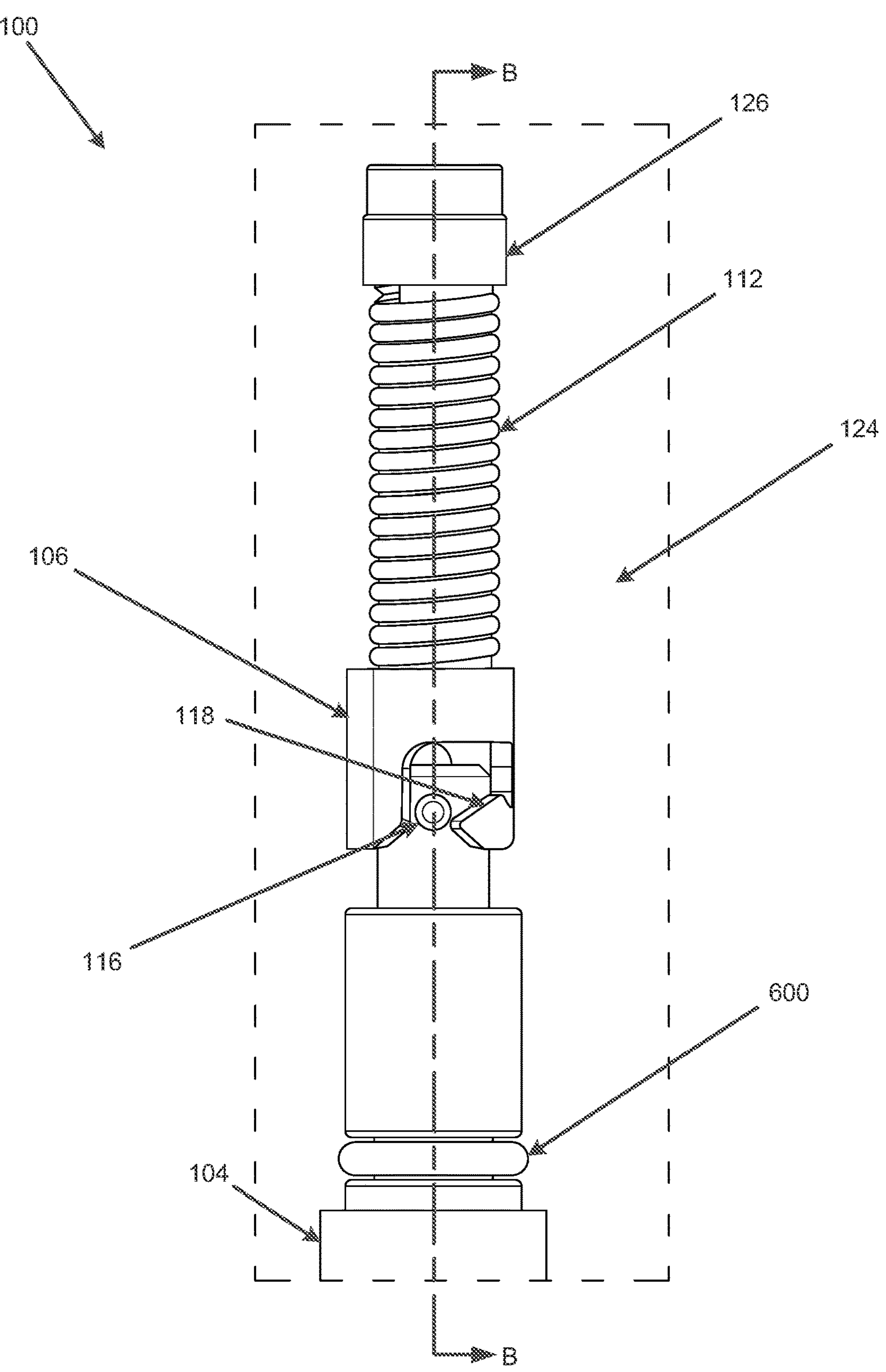
FIG. 5 illustrates a side view of the first embodiment of the shaft coupling system of FIG. 1 in an unlocked configuration, with the outer casing of the first shaft removed and the second shaft shown adjacent the disc of the first shaft, in accordance with an example of the present disclosure.

FIG. 5 illustrates a side view of the first embodiment of the shaft coupling system 100 in an unlocked configuration, with the outer casing 200 of the first shaft 102 removed and the second shaft 104 shown adjacent the disc 106 of the first shaft 102, in accordance with an example of the present disclosure.

Referring to FIGS. 1 and 5, the first shaft 102 and the second shaft 104 may be brought towards each other to retain (e.g., by locking) the second shaft 104 with the first shaft 102 when the second shaft 104 is rotated in the first direction 108 (e.g., as shown in FIG. 1). When the second shaft 104 is rotated in the first direction 108, the protrusion 116 may contact the angled tooth 118 to pull the disc 106 downwards in the orientation of FIG. 5. As the second shaft 104 continues to be rotated in the first direction 108, the protrusion 116 may enter the notch 114. This coupling of the first and second shafts may provide an acoustic and haptic feedback to signal locking of the first shaft 102 with the second shaft 104. Further, once the protrusion 116 is retained in the notch 114, the disc 106, by means of the spring 112, may pull the second shaft 104 towards the first shaft 102 (e.g., upwards in the orientation of FIG. 5).

Figure 6:
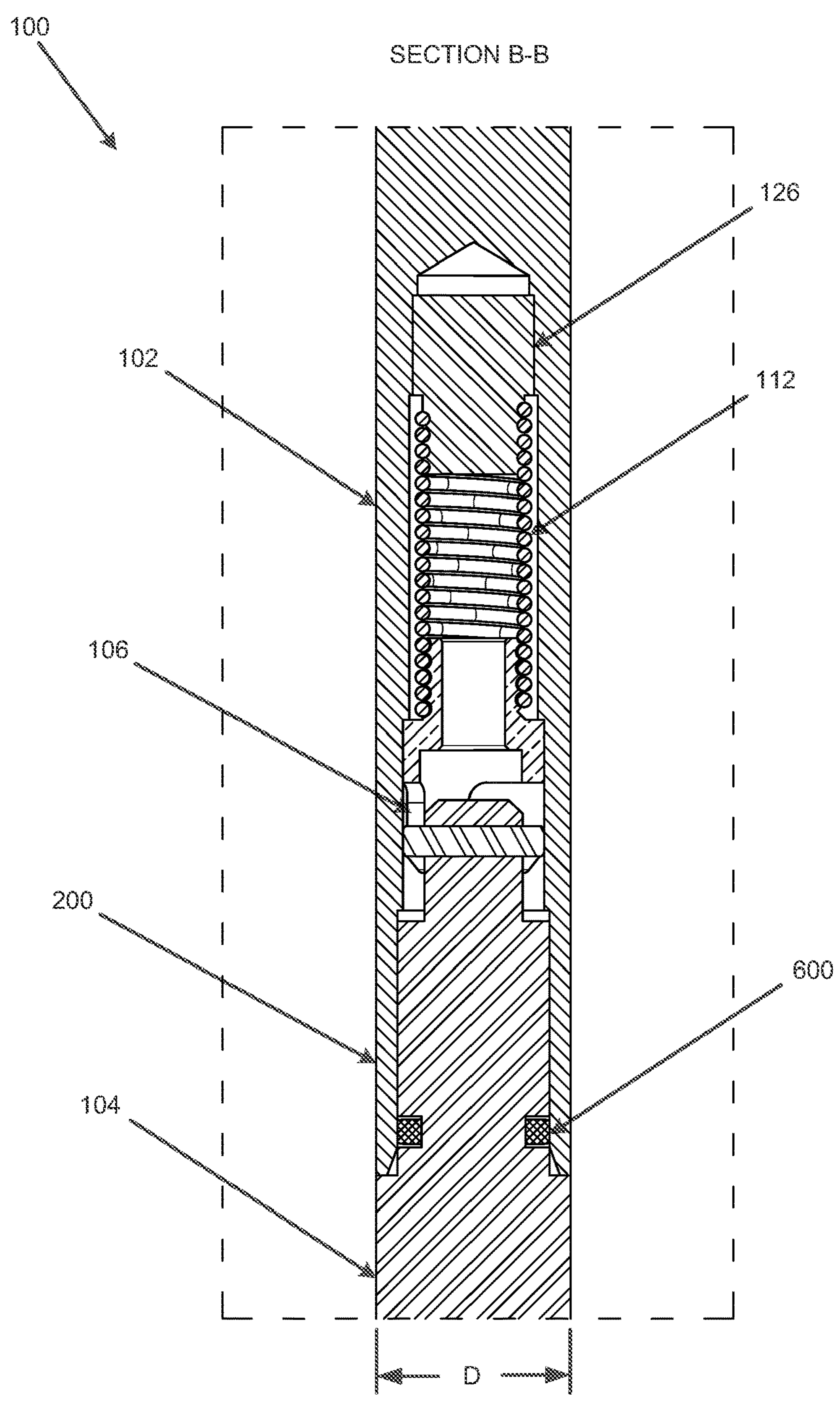
FIG. 6 illustrates a sectional view of the first embodiment of the shaft coupling system of FIG. 1 in an unlocked configuration, taken generally along section B-B of FIG. 5 and including the outer casing of the first shaft, in accordance with an example of the present disclosure.

FIG. 6 illustrates a sectional view of the first embodiment of the shaft coupling system 100 in an unlocked configuration, taken generally along section B-B of FIG. 5 and including the outer casing 200 of the first shaft 102, in accordance with an example of the present disclosure.

Referring to FIGS. 1 and 6, once the first shaft 102 is coupled with the second shaft 104, gasket 600 (e.g., see also FIG. 5) may form a seal with the inner surface of the hollow area 400 of the first shaft 102. The seal formed by the gasket 600 may prevent contaminants from entering the area of the disc 106 and the spring 112.

Figure 7:
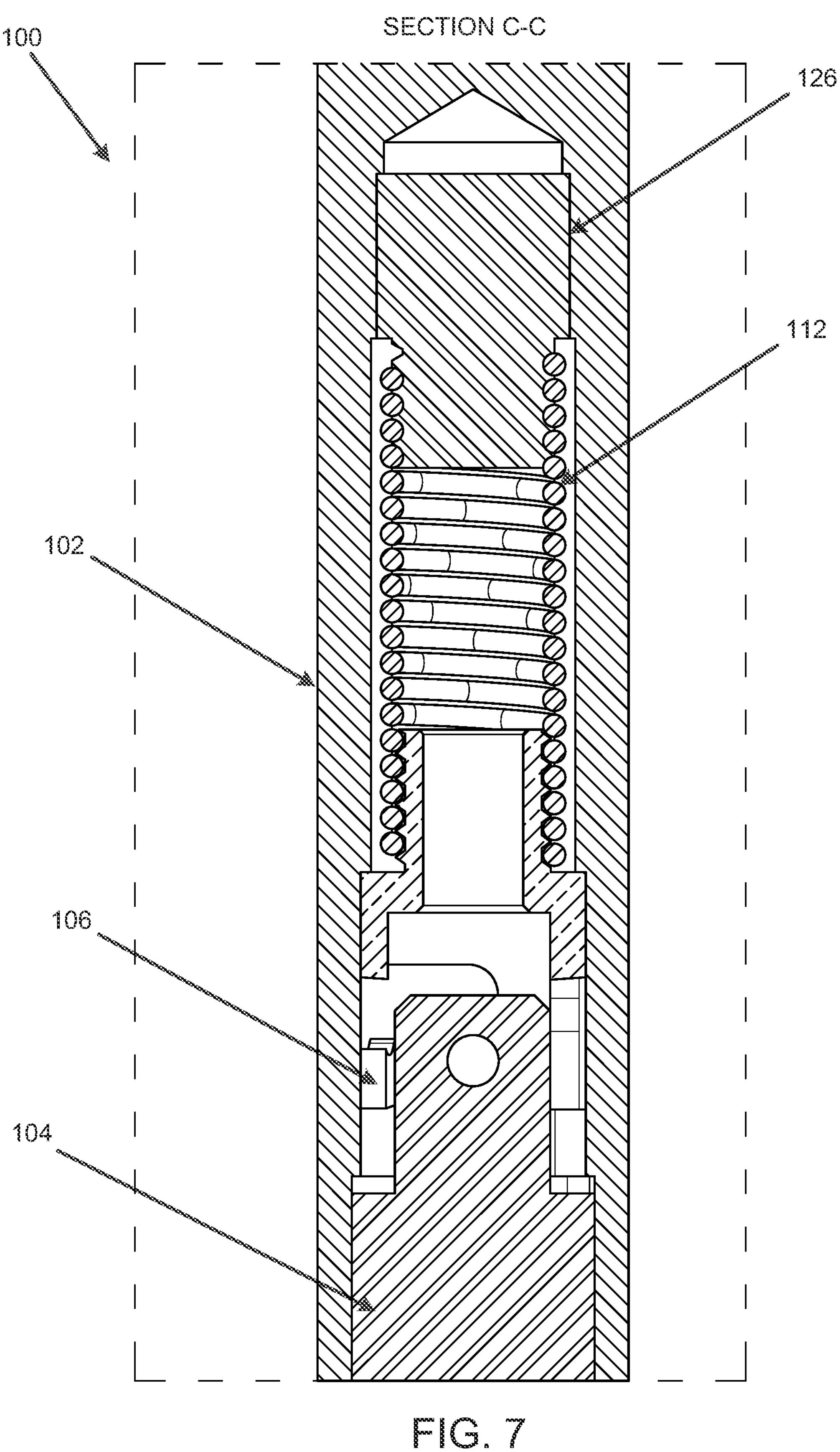
FIG. 7 illustrates a sectional view of the first embodiment of the shaft coupling system of FIG. 1 in an unlocked configuration, taken generally along section C-C that is 90° relative to section B-B of FIG. 5 (section C-C markings not shown in FIG. 5), and including the outer casing of the first shaft, in accordance with an example of the present disclosure.

FIG. 7 illustrates a sectional view of the first embodiment of the shaft coupling system 100 in an unlocked configuration, taken generally along section C-C that is 90° relative to section B-B of FIG. 5 (section C-C markings not shown in FIG. 5), and including the outer casing 200 of the first shaft 102, in accordance with an example of the present disclosure.

Referring to FIGS. 1 and 7, with respect to the unlocked configuration, the second shaft 104 may be pushed towards the first shaft 102 and further rotated in the second direction 110 (e.g., see FIG. 1) to release the protrusion 116 from the notch 114. In this regard, as the second shaft 104 is rotated in the second direction 110, the angled tooth 118 may guide the protrusion 116 away from the notch 114 to allow the second shaft 104 to be separated from the first shaft 102.

Figure 8:
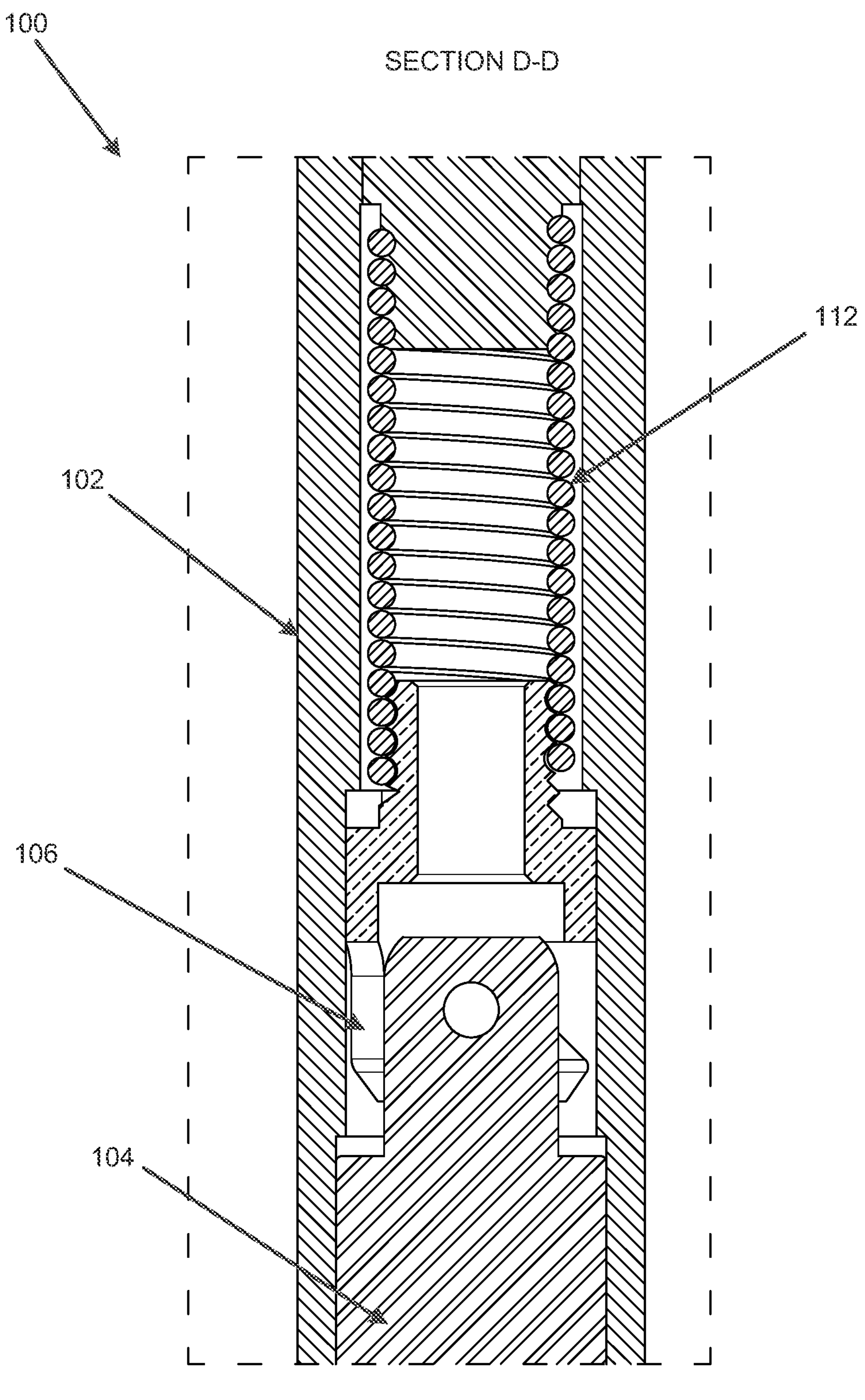
FIG. 8 illustrates a sectional view of the first embodiment of the shaft coupling system of FIG. 1 in a locked configuration, taken generally along section D-D of FIG. 1 (section D-D markings not shown in FIG. 1), where section D-D is 90° relative to section B-B of FIG. 5, in accordance with an example of the present disclosure.

FIG. 8 illustrates a sectional view of the first embodiment of the shaft coupling system 100 in a locked configuration, taken generally along section D-D of FIG. 1 (section D-D markings not shown in FIG. 1), where section D-D is 90° relative to section B-B of FIG. 5, in accordance with an example of the present disclosure.

Referring to FIGS. 1, 5, and 8, in a similar manner as disclosed herein with respect to FIG. 5, once the protrusion 116 is retained in the notch 114 to lock the first shaft 102 to the second shaft 104, the disc 106, by means of the spring 112, may pull the second shaft 104 towards the first shaft 102 (e.g., upwards in the orientation of FIGS. 5 and 8).

Figures 9A, 9B, 9C, 9D:
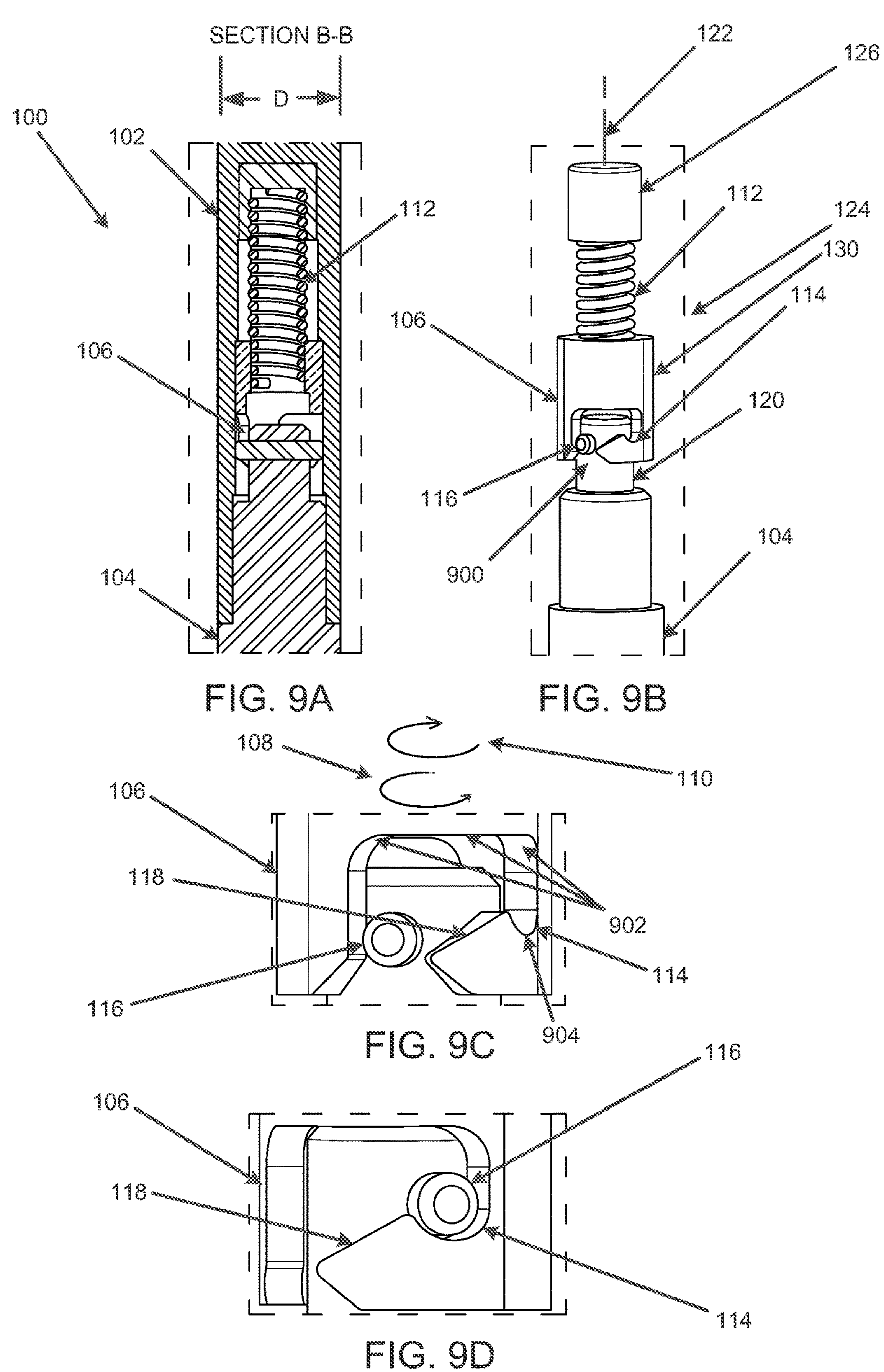
FIG. 9A illustrates a partial sectional view of the first embodiment of the shaft coupling system of FIG. 1 in an unlocked configuration, taken generally along section B-B of FIG. 5, in accordance with an example of the present disclosure.
FIG. 9B illustrates another partial isometric view of the first embodiment of the shaft coupling system of FIG. 1 in an unlocked configuration, in accordance with an example of the present disclosure.
FIG. 9C illustrates an enlarged partial isometric view of a disc and a protrusion of the first embodiment of the shaft coupling system of FIG. 1 in an unlocked configuration, in accordance with an example of the present disclosure.
FIG. 9D illustrates an enlarged partial isometric view of a disc and a protrusion of the first embodiment of the shaft coupling system of FIG. 1 in a locked configuration, in accordance with an example of the present disclosure.

FIG. 9A illustrates a partial sectional view of the first embodiment of the shaft coupling system 100 in an unlocked configuration, taken generally along section B-B of FIG. 5, in accordance with an example of the present disclosure. FIG. 9B illustrates another partial isometric view of the first embodiment of the shaft coupling system 100 in an unlocked configuration, in accordance with an example of the present disclosure. FIG. 9C illustrates an enlarged partial isometric view of the disc 106 and the protrusion 116 of the first embodiment of the shaft coupling system 100 in an unlocked configuration, in accordance with an example of the present disclosure. FIG. 9D illustrates an enlarged partial isometric view of the disc 106 and the protrusion 116 of the first embodiment of the shaft coupling system 100 in a locked configuration, in accordance with an example of the present disclosure.

Referring to FIGS. 1-9D and particularly FIGS. 9B-9D, the second shaft 104 may be engaged with the disc 106 of the first shaft 102 by rotating the second shaft 104 in the first direction 108 relative to the first shaft 102. The second shaft 104 may be disengaged from the first shaft 102 by rotating the second shaft 104 in the second direction 110 relative to the first shaft 102. The second direction may be generally opposite to the first direction. Further, as shown in FIG. 9B, the spring 112 mounted to the first shaft 102 may bias the second shaft 104 towards the first shaft 102 when the second shaft 104 is engaged with the first shaft 102.

As shown in FIGS. 1 and 9D, engaging the second shaft 104 with the disc 106 of the first shaft 102 may further include engaging the second shaft 104 with the first shaft 102 by retaining the protrusion 116 of the second shaft 104 with the notch 114 in the disc 106.

As shown in FIGS. 1, 9C, and 9D, the protrusion 116 may be guided into the notch 114 by the angled tooth 118 of the disc 106 when the second shaft 104 is rotated in the first direction 108. Similarly, the protrusion 116 may be guided away from the notch 114 by the angled tooth 118 of the disc 106 when the second shaft 104 is rotated in the second direction 110.

As shown in FIG. 9B, the spring 112 may bias the disc 106 away from the second shaft 104 when the second shaft 104 is engaged with the first shaft 102.

As shown in FIGS. 1 and 9B-9D, engaging the second shaft 104 with the disc 106 of the first shaft 102 may further include engaging the protrusion 116 of the second shaft 104 with the disc 106 to engage the second shaft 104 with the first shaft 102. The protrusion 116 may protrude orthogonally from the reduced diameter portion 120 of the second shaft 104.

As shown in FIGS. 1 and 9B-9D, engaging the second shaft 104 with the disc 106 of the first shaft 102 may further include receiving, by the opening 900 in the disc 106, the protrusion 116 of the second shaft 104, and engaging the second shaft 104 with the first shaft 102 by radially exiting the protrusion 116 through the disc 106 relative to the central axis 122 of the disc 106 to engage the disc 106.

Referring to FIGS. 1-9D, the first embodiment of the shaft coupling system 100 may thus include the profiled disc 106 that is permanently pushed or pulled in one direction (e.g., upwards in the orientation of FIGS. 9A-9D) in the first shaft 102. By pushing the second shaft 104 through the disc and turning the second shaft 104 by 90°, the first shaft 102 may be coupled (e.g., locked) to the second shaft 104. The disc 106 may be spring loaded in that the second shaft geometry may interact with the spring loaded disc in the first shaft 102, where the disc 106 may not rotate, but may move (e.g., up or down in the orientation of FIGS. 9A-9D) by force of the second shaft rotation. The force and/or torque needed for coupling the first and second shafts may be relatively lower compared to decoupling of the first shaft from the second shaft. These variations in coupling versus decoupling may be achieved by asymmetric shapes in the spring loaded disc as shown in FIGS. 9B-9D. The spring 112, which may constantly pull the second shaft 104 towards the first shaft 102, may create a relatively strong connection between the first and second shafts to prevent loosening over time. This spring action may also function as a force limiter against pulling too strong, which may cause possible damage to an associated instrument.

For the shaft coupling system 100, the coupling of the first shaft 102 and the second shaft 104 may be realized without any change in an outer diameter of the first and second shafts. In this regard, as shown in FIGS. 6 and 9A, when the first and second shafts are coupled together, the shafts may include a continuous outer diameter D without any gaps.

Figure 10:
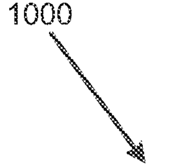
FIG. 10 illustrates partial isometric views of first and second shafts of a second embodiment of a shaft coupling system, in accordance with an example of the present disclosure.
Figure 10:
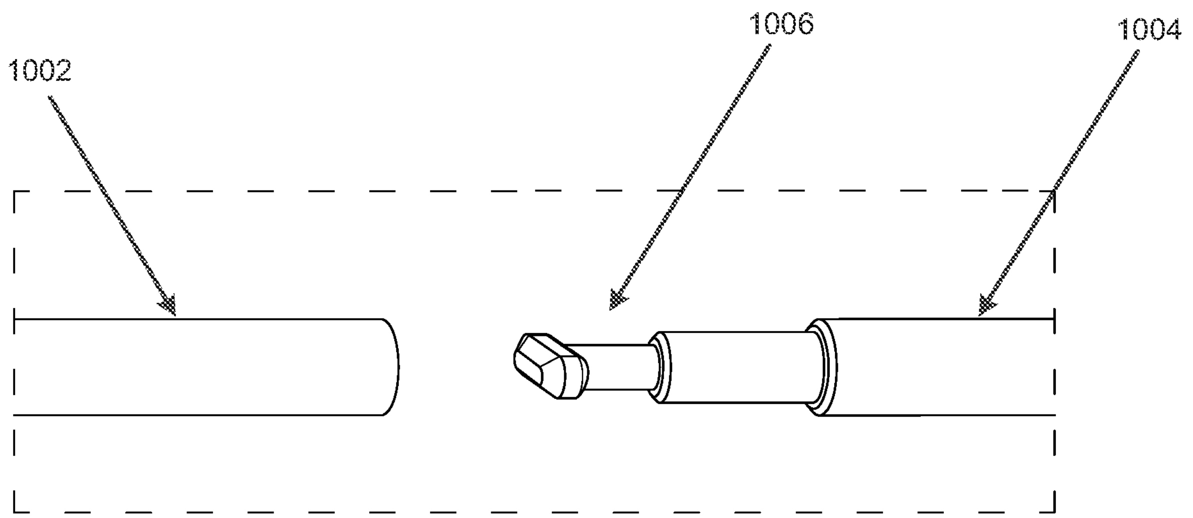

FIG. 10 illustrates partial isometric views of a first shaft 1002 and a second shaft 1004 of a second embodiment of a shaft coupling system 1000, in accordance with an example of the present disclosure.

Figures 11A, 11B, 11C, 11D:
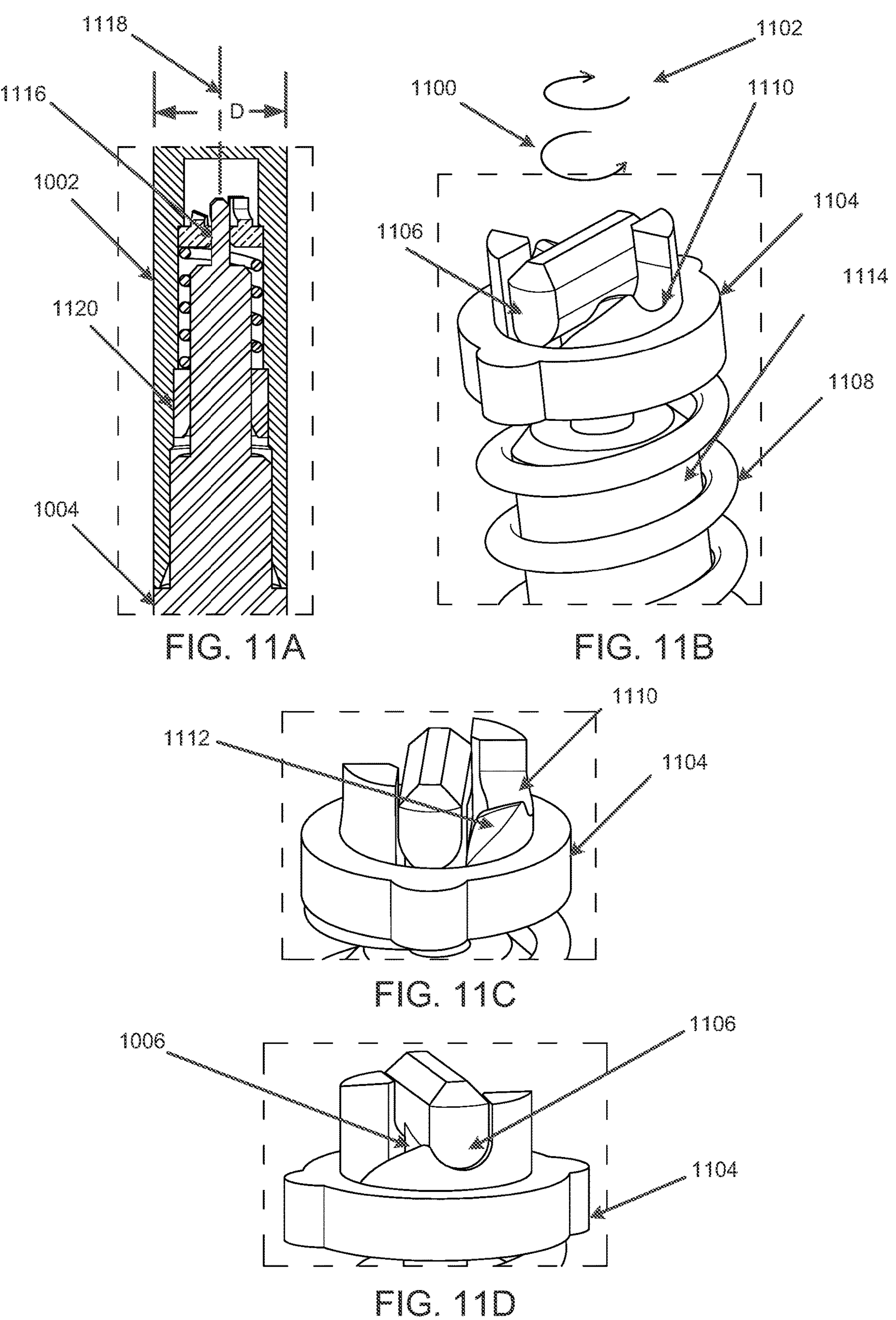
FIG. 11A illustrates a partial sectional view of the second embodiment of the shaft coupling system of FIG. 10 in an unlocked configuration, in a similar orientation as FIG. 9A, in accordance with an example of the present disclosure.
FIG. 11B illustrates an enlarged partial isometric view of the second embodiment of the shaft coupling system of FIG. 10 in an unlocked configuration, in accordance with an example of the present disclosure.
FIG. 11C illustrates an enlarged partial isometric view of a disc and a protrusion of the second embodiment of the shaft coupling system of FIG. 10 in an unlocked configuration, in accordance with an example of the present disclosure.
FIG. 11D illustrates an enlarged partial isometric view of a disc and a protrusion of the second embodiment of the shaft coupling system of FIG. 10 in a locked configuration, in accordance with an example of the present disclosure.

FIG. 11A illustrates a partial sectional view of the second embodiment of the shaft coupling system 1000 in an unlocked configuration, in a similar orientation as FIG. 9A, in accordance with an example of the present disclosure. FIG. 11B illustrates an enlarged partial isometric view of the second embodiment of the shaft coupling system 1000 in an unlocked configuration, in accordance with an example of the present disclosure. FIG. 11C illustrates an enlarged partial isometric view of a disc 1104 and a protrusion 1106 of the second embodiment of the shaft coupling system 1000 in an unlocked configuration, in accordance with an example of the present disclosure. FIG. 11D illustrates an enlarged partial isometric view of the disc 1104 and the protrusion 1106 of the second embodiment of the shaft coupling system 1000 in a locked configuration, in accordance with an example of the present disclosure.

Referring to FIGS. 10 and 11A-11D, the second embodiment of the shaft coupling system 1000 is shown as including the first shaft 1002 including the disc 1104 that is engageable by the second shaft 1004 to retain (e.g., by locking) the second shaft 1004 with the first shaft 1002 when the second shaft is rotated in a first direction 1100, and release (e.g., by unlocking) the second shaft 1004 from the first shaft 1002 when the second shaft 1004 is rotated in a second direction 1102 that is opposite to the first direction 1100. A spring 1108 may be mounted to the first shaft 1002 to bias the second shaft 1004 towards the first shaft 1002 when the second shaft 1004 is retained with the first shaft 1002. The spring 1108 may be attached to the disc 1104 to retain the disc 1104 relative to a retention sleeve 1120.

With respect to the shaft coupling system 1000, the disc 1104 may be movable. Specifically, the first shaft 1002 may include the movable disc 1104 that is engageable by the second shaft 1004 to retain the second shaft 1004 with the first shaft 1002 based on a first movement (e.g., bringing the second shaft 1004 towards the first shaft 1002 and rotation) of the second shaft 1004 relative to the first shaft 1002, and release the second shaft 1004 from the first shaft 1002 based on a second movement (e.g., opposite rotation and moving away from first shaft 1002) of the second shaft 1004 relative to the first shaft 1002. The second movement may be generally opposite of the first movement.

The disc 1104 may include a notch 1110 to retain a protrusion 1106 of the second shaft 1004 so as to retain the second shaft 1004 with the first shaft 1002. Further, the disc 1104 may include an angled tooth 1112 to guide the protrusion 1106 into the notch 1110 when the second shaft 1004 is rotated in the first direction 1100. The coupling of the first and second shafts when the protrusion 1106 enters into the notch 1110 may provide an acoustic and haptic feedback to signal locking of the first shaft 1002 with the second shaft 1004. Similarly, the angled tooth 1112 may guide the protrusion 1106 away from the notch 1110 when the second shaft 1004 is rotated in the second direction 1102.

The spring 1108 may bias the disc 1104 away from the second shaft 1004 when the second shaft 1004 is retained with the first shaft 1002 to thus push the second shaft 1004 towards the first shaft 1002. The spring 1108 may include a compression spring that compresses when the second shaft 1004 is retained with the first shaft 1002.

The second shaft may include the protrusion 1106 (or additional protrusions) that engages the disc 1104 to retain the second shaft 1004 with the first shaft 1002. Further, the protrusion may be formed on a T-shaped extension 1006 on a reduced diameter portion 1114 of the second shaft 1004.

The disc 1104 may include an opening 1116 (see FIG. 11A) to receive the protrusion 1106 of the second shaft 1004. The protrusion 1106 may exit axially through the disc 1104 relative to a central axis 1118 of the disc 1104 and engage the disc 1104 to retain the second shaft 1004 with the first shaft 1002.

Referring to FIGS. 10 and 11A-11D and particularly FIGS. 11B-11D, the second shaft 1004 may be engaged with the disc 1104 of the first shaft 1002 by rotating the second shaft 1004 in the first direction 1100 relative to the first shaft 1002. The second shaft 1004 may be disengaged from the first shaft 1002 by rotating the second shaft 1004 in the second direction 1102 relative to the first shaft 1002. The second direction may be generally opposite to the first direction. Further, as shown in FIG. 1B, the spring 1108 mounted to the first shaft 1002 may bias the second shaft 1004 towards the first shaft 1002 when the second shaft 1004 is engaged with the first shaft 1002.

As shown in FIGS. 10 and 11D, engaging the second shaft 1004 with the disc 1104 of the first shaft 1002 may further include engaging the second shaft 1004 with the first shaft 1002 by retaining the protrusion 1106 of the second shaft 1004 with the notch 1110 in the disc 1104.

As shown in FIGS. 10, 11C, and 11D, the protrusion 1106 may be guided into the notch 1110 by the angled tooth 1112 of the disc 1104 when the second shaft 1004 is rotated in the first direction 1100. Similarly, the protrusion 1106 may be guided away from the notch 1110 by the angled tooth 1112 of the disc 1104 when the second shaft 1004 is rotated in the second direction 1102.

The shaft coupling system 1000 may thus include the profiled disc 1104 that is permanently pushed in one direction (e.g., upwards) in the first shaft 1002. By pushing the second shaft 1004 through the disc 1104 and turning the second shaft 1004 by 90°, the first shaft 1002 may be coupled (e.g., locked) to the second shaft 1004. The disc 1104 may be spring loaded in that the second shaft geometry may interact with the spring loaded disc in the first shaft 1002, where the disc may not rotate, but may move (e.g., up or down) by force of the second shaft rotation. The force and/or torque needed for coupling the first and second shafts may be relatively lower compared to decoupling of the first shaft 1002 from the second shaft 1004. These variations in coupling versus decoupling may be achieved by asymmetric shapes in the spring loaded disc 1104 as shown in FIGS. 11B-11D. The spring 1108, which may constantly push the second shaft 1004 towards the first shaft 1002, may create a relatively strong connection between the first and second shafts to prevent loosening over time. This spring action may also function as a force limiter against pulling too strong, which may cause possible damage to an associated instrument.

For the shaft coupling system 1000, the coupling of the first shaft 1002 and the second shaft 1004 may be realized without any change in an outer diameter of the first and second shafts. In this regard, as shown in FIG. 11A, when the first and second shafts are coupled together, the shafts may include a continuous outer diameter D without any gaps.

With respect to the shaft coupling system 100, instead of or in addition to the spring 112, the disc 106 and the protrusion 116 may be magnetically biased to attract or repel. For example, for the shaft coupling system 100, the disc 106 may be magnetically biased at areas 902 to repel the protrusion 116 that is magnetically biased with the same polarity as the bias at areas 902. Further, the disc 106 may be magnetically biased at area 904 to attract the protrusion 116 that is magnetically biased with the opposite polarity as the bias at area 904. In this manner, the magnetic bias may provide similar functionality as the spring 112 to pull the second shaft 104 towards the first shaft 102 (e.g., upwards in the orientation of FIG. 5).

Figure 12:
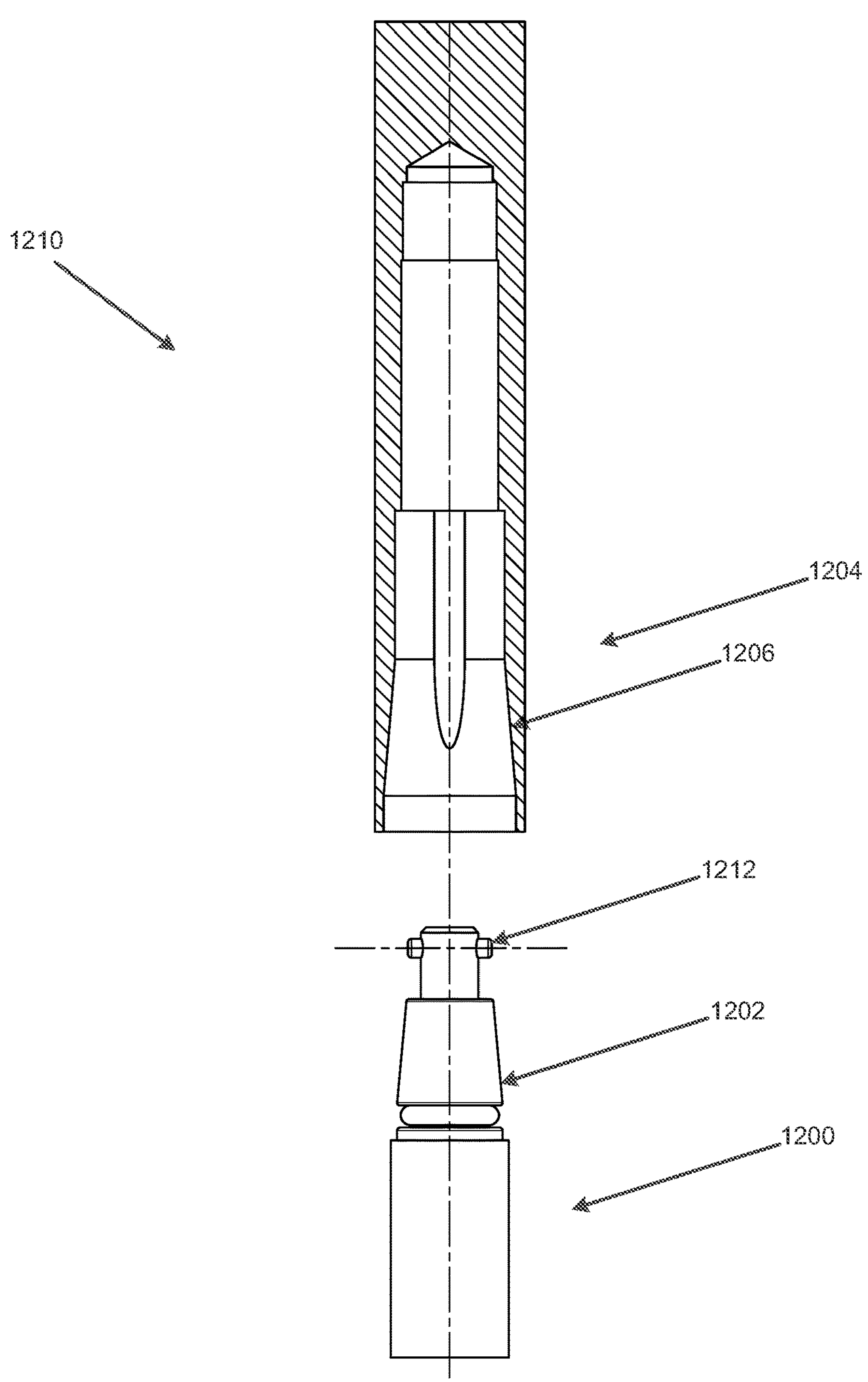
FIG. 12 illustrates side views of first and second shafts of a third embodiment of a shaft coupling system, with the first shaft shown in a cutout view, in accordance with an example of the present disclosure.

FIG. 12 illustrates side views of first and second shafts of a third embodiment of a shaft coupling system 1210, with the first shaft shown in a cutout view, in accordance with an example of the present disclosure.

Referring to FIG. 12, with respect to the shaft coupling system 1210, compared to the example of the second shaft 104 of FIG. 1 that includes a circular section 128, second shaft 1200 of FIG. 12 is shown as including a conical section 1202. In this regard, the second shaft 1200 may engage with a first shaft 1204 in a similar manner as second shaft 104 engages with the first shaft 102. For example, male conical section 1202 of the second shaft 1200 may engage with female conical section 1206 of the first shaft 1204. The engagement of the conical sections 1202 and 1206 may provide additional rigidity to the connection of the first shaft 1204 to the second shaft 1200.

Figures 13, 14:
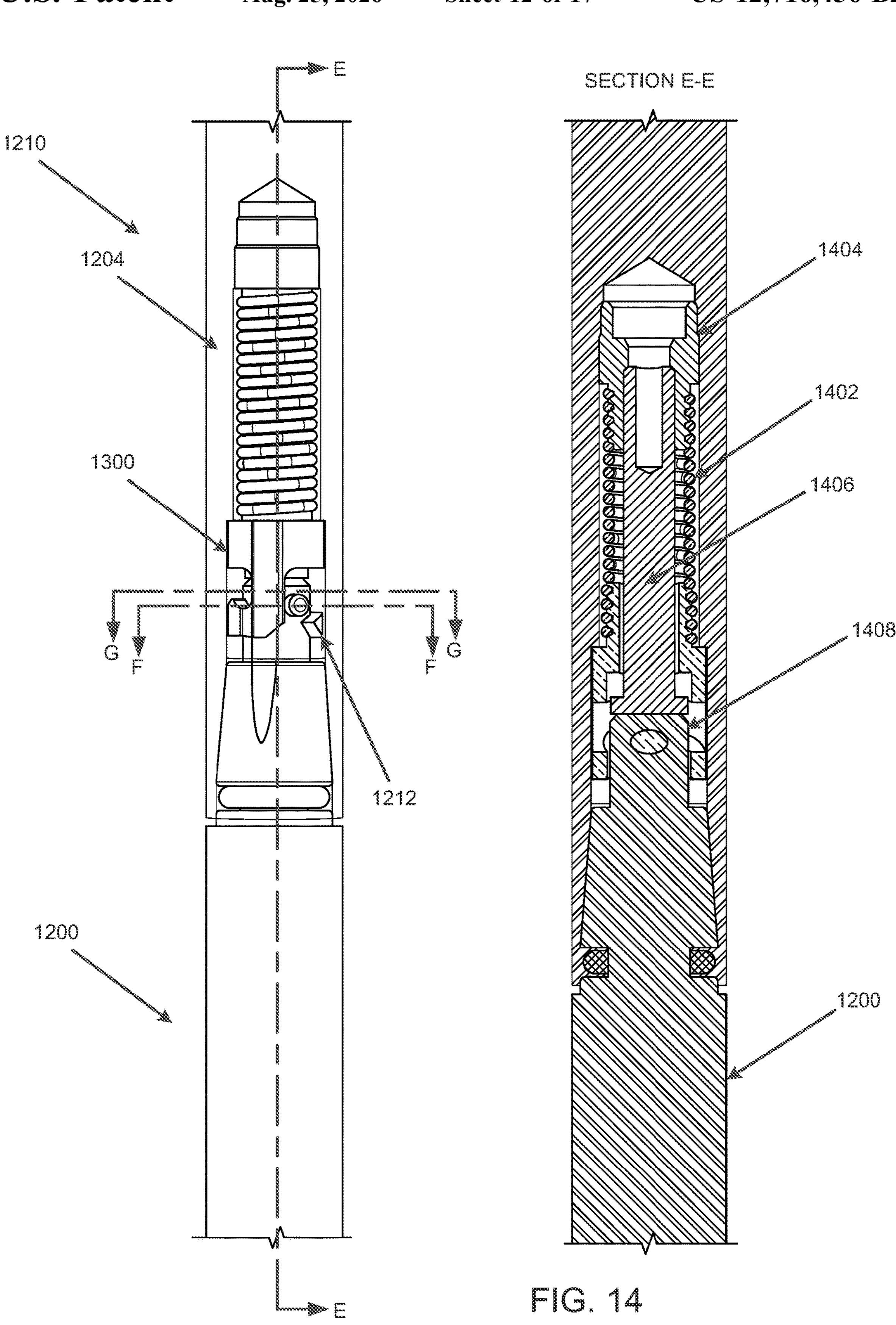
FIG. 13 illustrates a side view of the third embodiment of the shaft coupling system of FIG. 12 in an unlocked configuration, with the outer casing of the first shaft removed and the second shaft shown adjacent the disc of the first shaft, in accordance with an example of the present disclosure.
FIG. 14 illustrates a sectional view of the third embodiment of the shaft coupling system of FIG. 12 in an unlocked configuration, taken generally along section E-E of FIG. 13 and including the outer casing of the first shaft, in accordance with an example of the present disclosure.

FIG. 13 illustrates a side view of the third embodiment of the shaft coupling system 1210 in an unlocked configuration, with the outer casing of the first shaft 1204 removed and the second shaft 1200 shown adjacent a disc 1300 of the first shaft, in accordance with an example of the present disclosure. FIG. 14 illustrates a sectional view of the third embodiment of the shaft coupling system 1210 in an unlocked configuration, taken generally along section E-E of FIG. 13 and including the outer casing of the first shaft 1204, in accordance with an example of the present disclosure.

Referring to FIGS. 13 and 14, compared to the shaft coupling system 100 of FIG. 1 that includes the spring 112 mounted to the retention sleeve 126 and the disc 106 without an intermediate support, a spring 1402 may be mounted to retention sleeve 1404 and the disc 1300 with an intermediate support 1406. The intermediate support 1406 may provide additional rigidity to the structure including the disc 1300, the spring 1402, and the retention sleeve 1404.

Figures 15, 16:
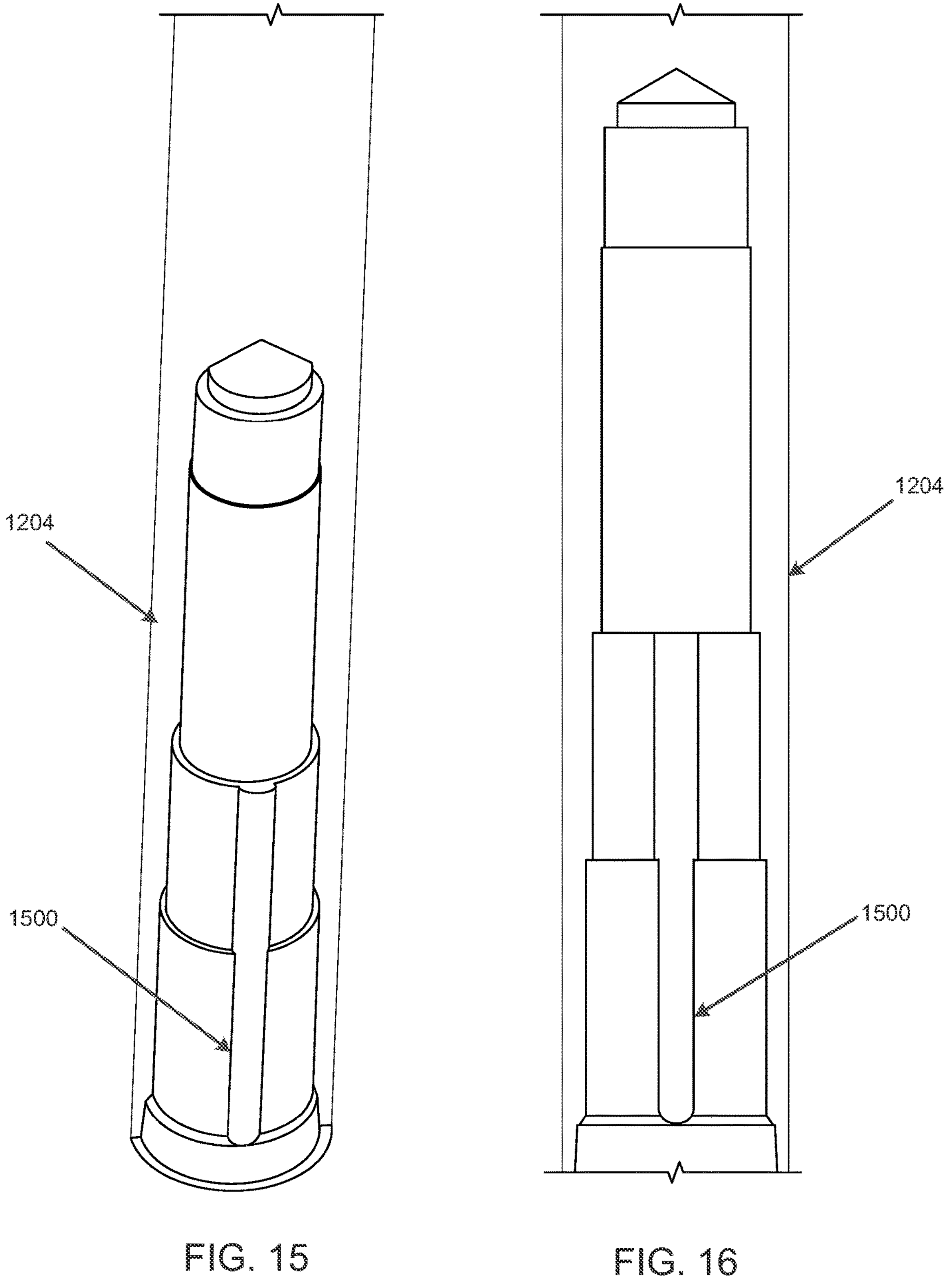
FIG. 15 illustrates an isometric cutout view of the first shaft of the third embodiment of the shaft coupling system of FIG. 12, illustrating a groove, in accordance with an example of the present disclosure.
FIG. 16 illustrates a side cutout view of the first shaft of the third embodiment of the shaft coupling system of FIG. 12, illustrating the groove, in accordance with an example of the present disclosure.

FIG. 15 illustrates an isometric cutout view of the first shaft 1204 of the third embodiment of the shaft coupling system 1210, illustrating a groove 1500, in accordance with an example of the present disclosure. FIG. 16 illustrates a side cutout view of the first shaft 1204 of the third embodiment of the shaft coupling system 1210, illustrating the groove 1500, in accordance with an example of the present disclosure.

Referring to FIGS. 15 and 16, in a similar manner as elongated protrusion 130 (e.g., see FIG. 9B), the disc 1300 may include elongated protrusion 1800 (e.g., see FIG. 18) that engages complementary groove 1500. The engagement of the elongated protrusion 1800 in the complementary groove 1500 may prevent rotation of the disc 1300 to thus enable transfer of torque from the first shaft 1204 to the second shaft 1200. Further, the engagement of the elongated protrusion 1800 in the complementary groove 1500 may prevent rotation of the disc 1300 to thus enable engagement of protrusion 1212 into notch 1802 (in a similar manner as protrusion 116 engages notch 114). The first shaft 102 may include a similar groove as the groove 1500 of the first shaft 1204.

Figures 17, 18:
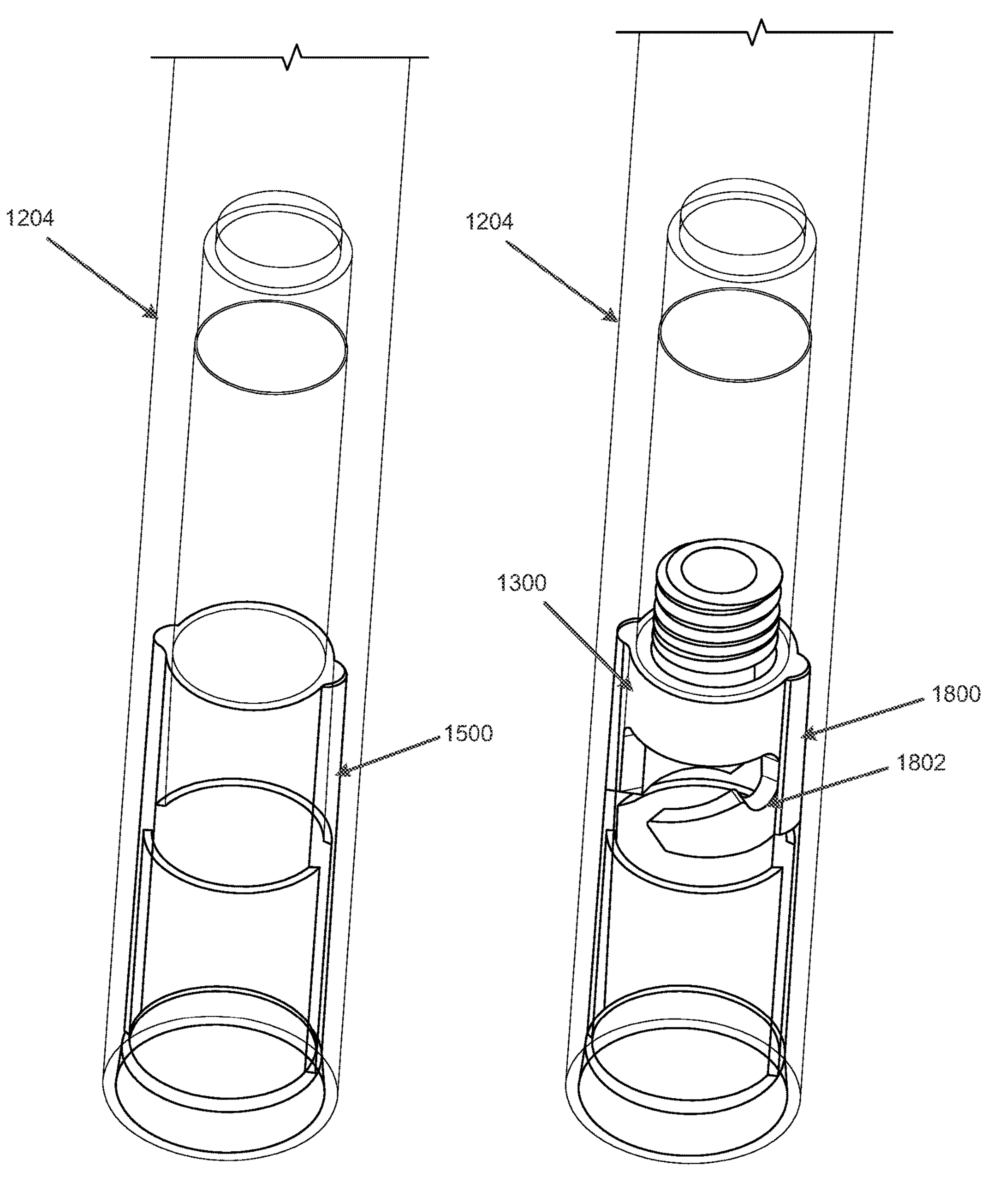
FIG. 17 illustrates an isometric line-drawing view of the first shaft of the third embodiment of the shaft coupling system of FIG. 12, illustrating the groove, in accordance with an example of the present disclosure.
FIG. 18 illustrates an isometric line-drawing view of the first shaft of the third embodiment of the shaft coupling system of FIG. 12, illustrating the elongated protrusion of the disc in the groove, in accordance with an example of the present disclosure.

FIG. 17 illustrates an isometric line-drawing view of the first shaft 1204 of the third embodiment of the shaft coupling system 1210, illustrating the groove 1500, in accordance with an example of the present disclosure. FIG. 18 illustrates an isometric line-drawing view of the first shaft 1204 of the third embodiment of the shaft coupling system 1210, illustrating the elongated protrusion 1800 of the disc 1300 in the groove 1500, in accordance with an example of the present disclosure.

Referring to FIGS. 17 and 18, as disclosed herein with respect to FIGS. 15 and 16, the disc 1300 is shown as including the elongated protrusion 1800 that engages complementary groove 1500.

Figures 19, 20:
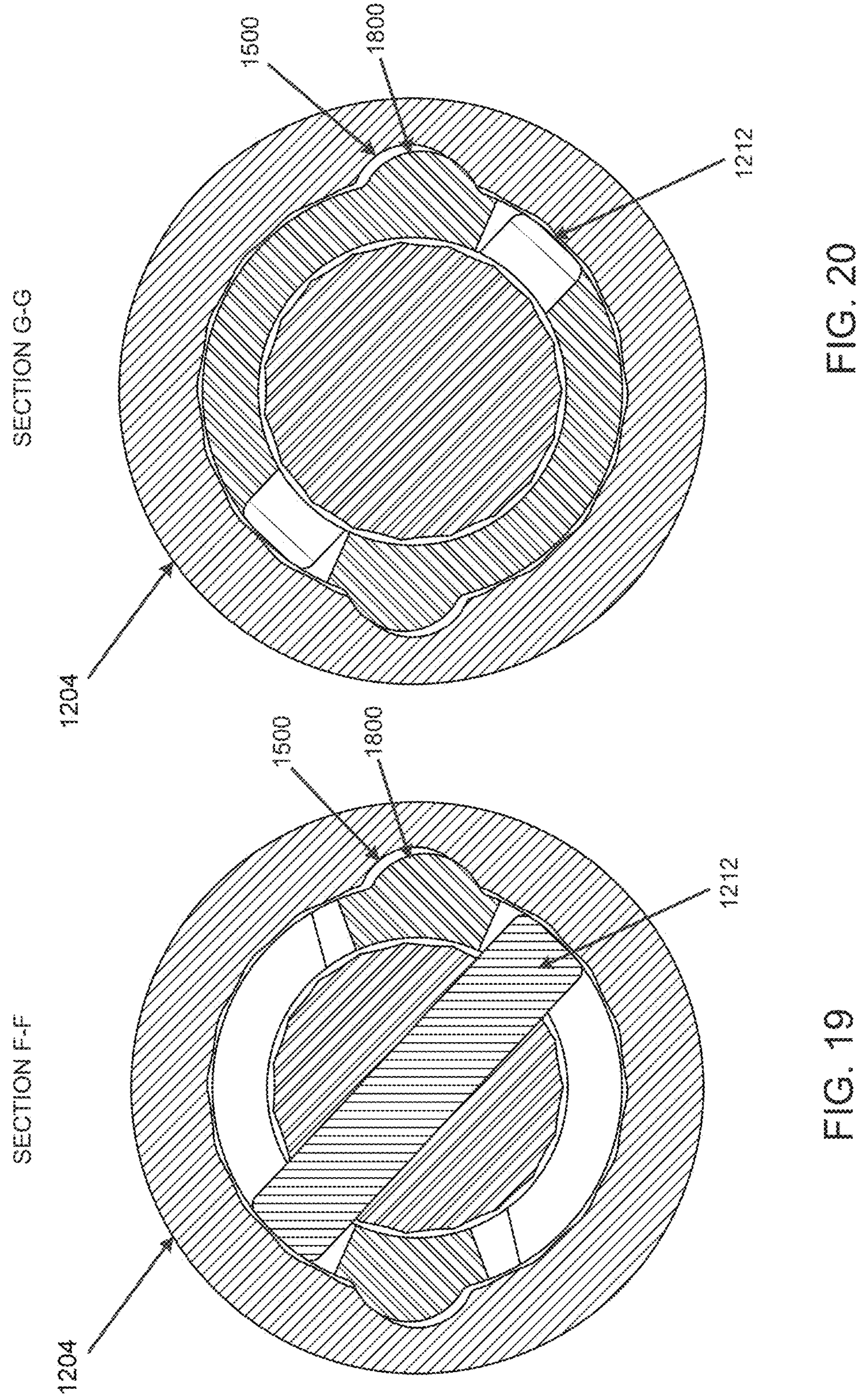
FIG. 19 illustrates a sectional view of the first shaft of the third embodiment of the shaft coupling system of FIG. 12, taken generally along section F-F of FIG. 13, illustrating the elongated protrusion of the disc in the groove, in accordance with an example of the present disclosure.
FIG. 20 illustrates a sectional view of the first shaft of the third embodiment of the shaft coupling system of FIG. 12, taken generally along section G-G of FIG. 13, illustrating the elongated protrusion of the disc in the groove, in accordance with an example of the present disclosure.

FIG. 19 illustrates a sectional view of the first shaft 1204 the third embodiment of the shaft coupling system 1210, taken generally along section F-F of FIG. 13, illustrating the elongated protrusion 1800 of the disc 1300 in the groove 1500, in accordance with an example of the present disclosure. FIG. 20 illustrates a sectional view of the first shaft 1204 of the third embodiment of the shaft coupling system 1210, taken generally along section G-G of FIG. 13, illustrating the elongated protrusion 1800 of the disc 1300 in the groove 1500, in accordance with an example of the present disclosure.

Referring to FIGS. 19 and 20, as disclosed herein with respect to FIGS. 15 and 16, engagement of the elongated protrusion 1800 in the complementary groove 1500 may prevent rotation of the disc 1300 to thus enable transfer of torque from the first shaft 1204 to the second shaft 1200. In this regard, the elongated protrusion 1800 and the complementary groove 1500 may include various different shapes (e.g., rectangular, etc.) other than the semi-circular shape shown in FIGS. 19 and 20.

Figure 21:
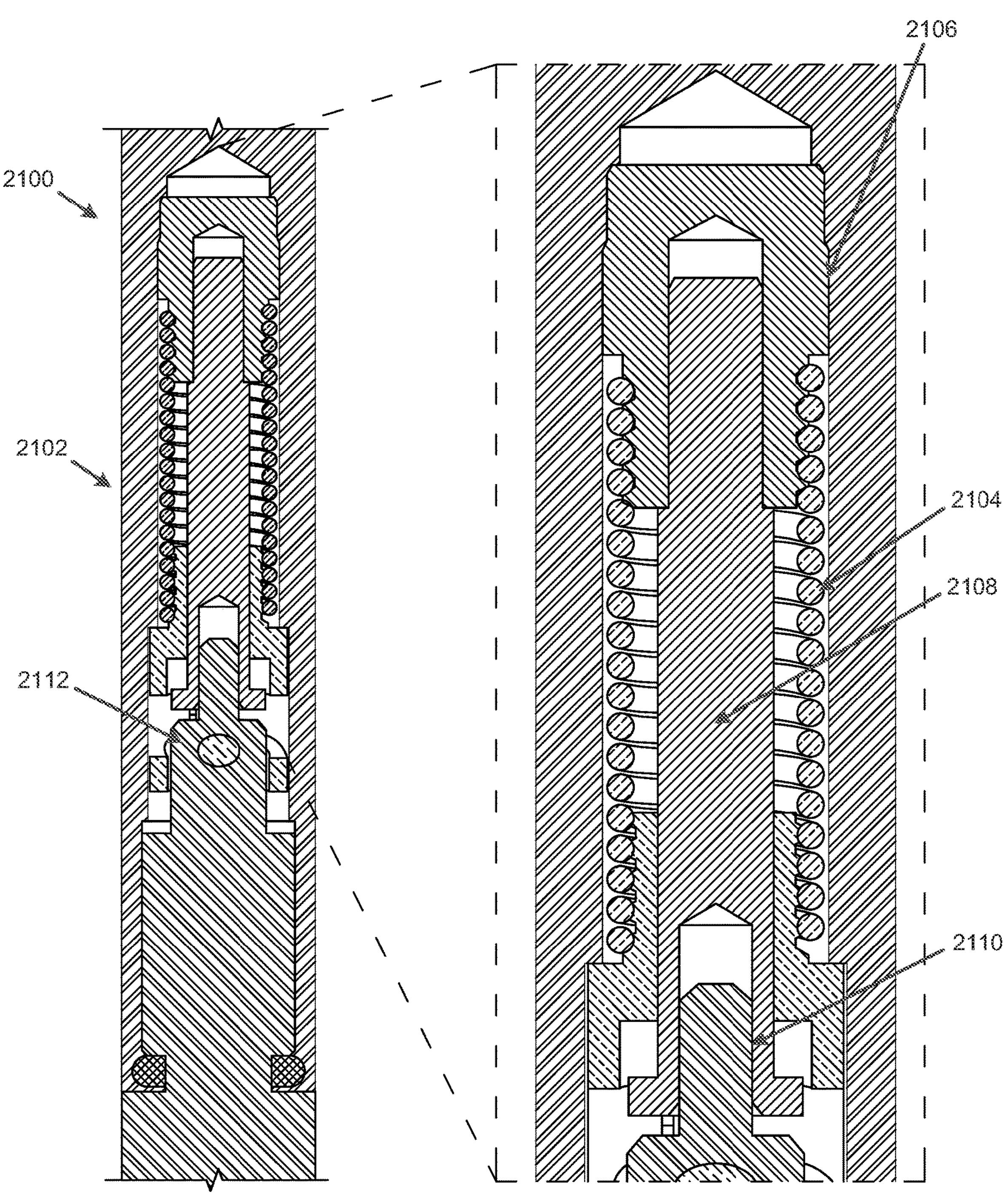
FIG. 21 illustrates a sectional view and an associated enlarged view of a fourth embodiment of a shaft coupling system in an unlocked configuration, similar to section E-E of FIG. 14 and including the outer casing of the first shaft, in accordance with an example of the present disclosure.

FIG. 21 illustrates a sectional view and an associated enlarged view of a fourth embodiment of a shaft coupling system 2100 in an unlocked configuration, similar to section E-E of FIG. 14 and including the outer casing of first shaft 2102, in accordance with an example of the present disclosure.

Referring to FIG. 21, as disclosed herein with respect to FIGS. 13 and 14, spring 1402 may be mounted to retention sleeve 1404 and the disc 1300 with an intermediate support 1406. The intermediate support 1406 may provide additional rigidity to the structure including the disc 1300, the spring 1402, and the retention sleeve 1404. For the example of FIG. 21, spring 2104 may be mounted to retention sleeve 2106 and disc 2200 (e.g., see FIG. 22) with an intermediate support 2108. Compared to the intermediate support 1406 of FIG. 14 that is threadedly or otherwise similarly mounted onto reduced diameter portion 1408, the intermediate support 2108 of FIG. 21 may engage with stem 2110 of reduced diameter portion 2112 and provide additional guidance to improve rigidity. Further, whereas the intermediate support 1406 of FIG. 14 is hollow and press-fit into the retention sleeve 1404, the intermediate support 2108 of FIG. 21 may be solid and press-fit into the retention sleeve 2106.

Figures 22, 23:
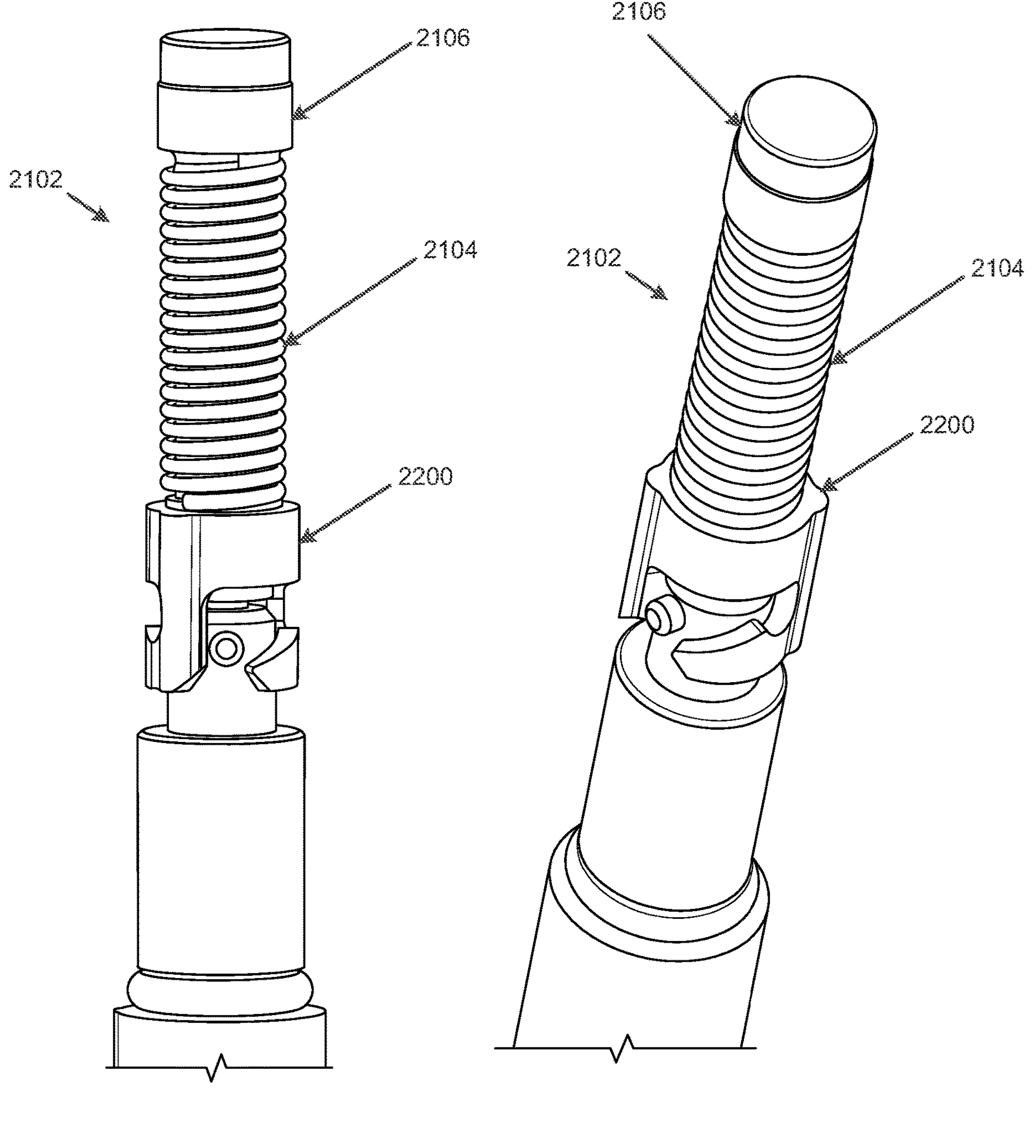
FIG. 22 illustrates a side view of the fourth embodiment of the shaft coupling system of FIG. 21 in an unlocked configuration, with the outer casing of the first shaft removed, in accordance with an example of the present disclosure.
FIG. 23 illustrates an isometric view of the fourth embodiment of the shaft coupling system of FIG. 21 in an unlocked configuration, with the outer casing of the first shaft removed, in accordance with an example of the present disclosure.

FIG. 22 illustrates a side view of the fourth embodiment of the shaft coupling system 2100 in an unlocked configuration, with the outer casing of the first shaft 2102 removed, in accordance with an example of the present disclosure. FIG. 23 illustrates an isometric view of the fourth embodiment of the shaft coupling system 2100 in an unlocked configuration, with the outer casing of the first shaft 2102 removed, in accordance with an example of the present disclosure.

As disclosed herein with respect to FIG. 21, FIGS. 22 and 23 illustrate the shaft coupling system 2100 that includes the intermediate support 2108. The remaining functionality of the shaft coupling system 2100 may be similar to the shaft coupling system 100.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims- and their equivalents—in which all terms are meant in their broadest reasonable sense unless otherwise indicated.

What is claimed is:

1. A shaft coupling system comprising:

a first shaft including a disc that is engageable by a second shaft to retain the second shaft with the first shaft when the second shaft is rotated in a first direction, and release the second shaft from the first shaft when the second shaft is rotated in a second direction that is opposite to the first direction; and a spring mounted to the first shaft to bias the second shaft towards the first shaft when the second shaft is retained with the first shaft, wherein the disc includes an elongated external protrusion that includes a semi-cylindrical cross-section, wherein the protrusion is elongated along a central longitudinal axis of the disc, wherein the protrusion is engageable with a complementary internal groove of the first shaft to limit rotation of the disc, and wherein the internal groove is elongated along a central longitudinal axis of the first shaft.

2. The shaft coupling system according to claim 1, wherein the disc includes a notch to retain a protrusion of the second shaft so as to retain the second shaft with the first shaft.

3. The shaft coupling system according to claim 2, wherein the disc includes an angled tooth to guide the protrusion of the second shaft into the notch when the second shaft is rotated in the first direction.

4. The shaft coupling system according to claim 2, wherein the disc includes an angled tooth to guide the protrusion of the second shaft away from the notch when the second shaft is rotated in the second direction.

5. The shaft coupling system according to claim 1, wherein the spring biases the disc away from the second shaft when the second shaft is retained with the first shaft.

6. The shaft coupling system according to claim 1, wherein the spring includes an extension spring that extends when the second shaft is retained with the first shaft.

7. The shaft coupling system according to claim 1, wherein the spring includes a compression spring that compresses when the second shaft is retained with the first shaft.

8. The shaft coupling system according to claim 1, wherein the second shaft includes at least one protrusion that engages the disc to retain the second shaft with the first shaft, and wherein the at least one protrusion of the second shaft protrudes orthogonally from a reduced diameter portion of the second shaft.

9. The shaft coupling system according to claim 1, wherein the second shaft includes at least one protrusion that engages the disc to retain the second shaft with the first shaft, and wherein the at least one protrusion is formed on a T-shaped extension on a reduced diameter portion of the second shaft.

10. The shaft coupling system according to claim 1, wherein the disc includes an opening to receive at least one protrusion of the second shaft, and wherein the at least one protrusion of the second shaft exits radially through the disc relative to the central longitudinal axis of the disc and engages the disc to retain the second shaft with the first shaft.

11. The shaft coupling system according to claim 1, wherein the disc includes an opening to receive at least one protrusion of the second shaft, and wherein the at least one protrusion exits axially through the disc relative to a central axis of the disc and engages the disc to retain the second shaft with the first shaft.

12. The shaft coupling system according to claim 1, wherein the second shaft includes a male conical section that is engageable with a complementary female conical section of the first shaft.

13. A shaft coupling system comprising:

a first shaft including a movable disc that is engageable by a second shaft to retain the second shaft with the first shaft based on a first movement of the second shaft relative to the first shaft, and release the second shaft from the first shaft based on a second movement of the second shaft relative to the first shaft, wherein the second movement is generally opposite of the first movement, wherein the disc includes an elongated external protrusion that includes a semi-cylindrical cross-section, wherein the protrusion is elongated along a central longitudinal axis of the disc, wherein the protrusion is engageable with a complementary internal groove of the first shaft to limit rotation of the disc, and wherein the internal groove is elongated along a central longitudinal axis of the first shaft.

14. The shaft coupling system of claim 13, wherein the first shaft and the second shaft include a continuous outer diameter when the second shaft is retained with the first shaft.

15. A shaft coupling method comprising:

engaging a second shaft with a disc of a first shaft by rotating the second shaft in a first direction relative to the first shaft; and disengaging the second shaft from the first shaft by rotating the second shaft in a second direction relative to the first shaft, wherein the second direction is generally opposite to the first direction, wherein a spring mounted to the first shaft biases the second shaft towards the first shaft when the second shaft is engaged with the first shaft, wherein the disc includes an elongated external protrusion that includes a semi-cylindrical cross-section, wherein the protrusion is elongated along a central longitudinal axis of the disc, wherein the protrusion is engageable with a complementary internal groove of the first shaft to limit rotation of the disc, and wherein the internal groove is elongated along a central longitudinal axis of the first shaft.

16. The shaft coupling method according to claim 15, wherein engaging the second shaft with the disc of the first shaft further comprises:

engaging the second shaft with the first shaft by retaining a protrusion of the second shaft with a notch in the disc.

17. The shaft coupling method according to claim 16, further comprising:

guiding the protrusion of the second shaft into the notch by an angled tooth of the disc when the second shaft is rotated in the first direction; or guiding the protrusion of the second shaft away from the notch by the angled tooth of the disc when the second shaft is rotated in the second direction.

18. The shaft coupling method according to claim 15, further comprising:

biasing, by the spring, the disc away from the second shaft when the second shaft is engaged with the first shaft.

19. The shaft coupling method according to claim 15, wherein engaging the second shaft with the disc of the first shaft further comprises:

engaging at least one protrusion of the second shaft with the disc to engage the second shaft with the first shaft, wherein the at least one protrusion of the second shaft protrudes orthogonally from a reduced diameter portion of the second shaft.

* * * * *